US008616460B2

(12) United States Patent
Kurtz et al.

(10) Patent No.: US 8,616,460 B2
(45) **Date of Patent: *Dec. 31, 2013**

(54) METHOD FOR PROVIDING DYNAMIC OPTICAL ILLUSION IMAGES

(75) Inventors: Andrew F. Kurtz, Macedon, NY (US); Paul James Kane, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/181,760

(22) Filed: Jul. 13, 2011

(65) Prior Publication Data

US 2013/0016409 A1 Jan. 17, 2013

(51) Int. Cl.

| | |
|---|---|
| ***G02F 1/03*** | (2006.01) |
| ***G02F 1/07*** | (2006.01) |
| ***G02F 1/15*** | (2006.01) |
| ***G06K 9/00*** | (2006.01) |
| ***G06K 19/06*** | (2006.01) |
| ***G06K 19/00*** | (2006.01) |
| ***G06K 7/10*** | (2006.01) |
| ***G06K 7/14*** | (2006.01) |
| ***B42D 15/00*** | (2006.01) |

(52) U.S. Cl.

USPC ........... 235/494; 235/487; 235/454; 235/468; 235/462.34; 382/162; 359/241; 359/265; 283/91; 283/92

(58) Field of Classification Search

USPC ........ 283/91, 92; 359/12, 241, 265, 266, 267; 382/162–267; 235/468, 487, 494, 235/462.34, 454

See application file for complete search history.

(56) References Cited

U.S. PATENT DOCUMENTS

| | | | | |
|---|---|---|---|---|
| 4,034,494 | A * | 7/1977 | Lane | 40/427 |
| 5,407,711 | A * | 4/1995 | Lovison et al. | 428/13 |
| 5,741,578 | A * | 4/1998 | Sax | 428/212 |
| 6,357,799 | B1 * | 3/2002 | Shibata et al. | 283/91 |
| 7,002,532 | B2 * | 2/2006 | Suyama et al. | 345/6 |
| 7,136,522 | B2 | 11/2006 | Harrington et al. | |
| 7,674,747 | B1 * | 3/2010 | Long | 503/201 |
| 7,876,481 | B2 * | 1/2011 | Raksha et al. | 359/2 |
| 7,880,943 | B2 * | 2/2011 | Kittler et al. | 359/2 |
| 7,939,806 | B2 * | 5/2011 | Yakubovsky et al. | 250/363.04 |
| 8,385,640 | B2 * | 2/2013 | Kurtz et al. | 382/166 |

(Continued)

OTHER PUBLICATIONS

Fermüller et al., "Uncertainty in visual processes predicts geometrical optical illusions," Vision Research, vol. 44, pp. 727-749 (2004).

(Continued)

*Primary Examiner* — Daniel Walsh
(74) *Attorney, Agent, or Firm* — Kevin E. Spaulding

(57) ABSTRACT

A method for providing a printed optical illusion image having first and second illusion states, comprising: receiving a specification of an optical illusion image having one or more mutable portions; and printing the optical illusion image on a printing device using a plurality of colorants, wherein one or more of the colorants are appearance mutable colorants having spectral characteristics can be switched between a first colorant state and a second colorant state by application of an appropriate external stimulus. The printed optical illusion image can be switched between the first and second illusion states by applying the appropriate external stimulus to controllably switch the one or more appearance mutable colorants between their first and second colorant states, thereby switching the mutable portions of the printed optical illusion image between corresponding first and second appearance states.

43 Claims, 16 Drawing Sheets

(56) References Cited

U.S. PATENT DOCUMENTS

| | | | | |
|---|---|---|---|---|
| 2003/0067423 | A1 * | 4/2003 | Suyama et al. | 345/6 |
| 2003/0103905 | A1 * | 6/2003 | Ribi | 424/10.3 |
| 2005/0106367 | A1 * | 5/2005 | Raksha et al. | 428/199 |
| 2005/0181160 | A1 * | 8/2005 | Schneider | 428/36.4 |
| 2005/0219626 | A1 * | 10/2005 | Moncrieff | 358/3.12 |
| 2006/0016356 | A1 * | 1/2006 | Oohashi et al. | 101/465 |
| 2006/0097515 | A1 * | 5/2006 | Raksha et al. | 283/91 |
| 2008/0024725 | A1 | 1/2008 | Todd | |
| 2008/0024847 | A1 * | 1/2008 | Kittler et al. | 359/2 |
| 2008/0310869 | A1 * | 12/2008 | Iftime et al. | 399/51 |
| 2009/0200792 | A1 * | 8/2009 | Iftime et al. | 283/91 |
| 2010/0295755 | A1 * | 11/2010 | Broughton et al. | 345/32 |
| 2012/0074682 | A1 * | 3/2012 | Rosset | 283/72 |
| 2013/0016409 | A1 * | 1/2013 | Kurtz et al. | 359/9 |
| 2013/0016415 | A1 * | 1/2013 | Kurtz et al. | 359/244 |

OTHER PUBLICATIONS

Kitaoka, "A Brief Classification of Colour Illusions," Colour: Design & Creativity, vol. 5, pp. 1-9 (2010).

Kitaoka, "The effect of color on the optimized Fraser-Wilcox illusion," 9th L'OREAL Art and Science of Color Prize, pp. 1-16 (2006).

Backus et al., "Illusory motion from change over time in the response to contrast and luminance," Journal of Vision, vol. 5, pp. 1055-1069 (2005).

Belstraff et al, "Practical Application of Visual Illusions: errare humanum est," Proc. 2nd Symposium on Applied Perception in Graphics and Visualization, p. 161 (2005).

Kitaoka et al., "Phenomenal Characteristics of the Peripheral Drift Illusion," Vision, vol. 15, pp. 261-262 (2003).

Johansson, "Chromatic Properties of Thermochromic Inks," TAGA Proceedings (2006).

Kulcar et al., "Thermochromic Inks—Dynamic Colour Possibilities", Proc. CREATE Conference, pp. 202-206 (2010).

Kulcar et al., "Colorimetric properties of reversible thermochromic printing inks," Dyes and Pigments, vol. 86, pp. 271-277 (2010).

Changizi et al., "Perceiving the present and a systematization of illusions," Cognitive Science, vol. 32, pp. 459-503 (2008).

"Optical Illusions 4 Kids," http://opticalillusions4kids.blogspot.com/.

* cited by examiner

METHOD FOR PROVIDING DYNAMIC OPTICAL ILLUSION IMAGES

CROSS-REFERENCE TO RELATED APPLICATIONS

Reference is made to commonly assigned, co-pending U.S. patent application Ser. No. 13/181,780, entitled: "Printed dynamic optical illusion images," by Kurtz et al.; and to commonly assigned, U.S. patent application Ser. No. 13/181,828, now U.S. Pat. No. 8,385,640 entitled: "System for controlling dynamic optical illusion images," by Kurtz et al, both of which are incorporated herein by reference.

FIELD OF THE INVENTION

This invention pertains to the field of optical illusion images and more particularly to the creation and use of dynamic optical illusion images, whose appearance changes when subjected to an external stimulus.

BACKGROUND OF THE INVENTION

In considering the human visual system, most people immediately think about the eyes and the constituent parts, such as the cornea, pupil, eye lens, the vitreous humor, and the retina with the rods and cones. However, the human visual system also includes neural processing that enables image interpretation and understanding. Such neural processing generally occurs automatically, without any conscious consideration by the observer. For example, the images formed on the retina of each eye are upside down, but the visual system automatically provides orientational corrections. As another example, the ratios of the number of short or blue cones, the number of medium or green cones, and the number of long or red cones varies widely among individuals, as does the organization of these cones within the retina, whether randomly dispersed or clustered. The green cones are also much more light sensitive than the red or blue cones. Yet, by and large, most people perceive the various color shades in a sufficiently comparable way that we can agree upon the colors present in a scene.

The structure and response attributes of the human visual system impact perception; for example, in cinema, the temporal processing limits allow people to perceive continuous motion from a series of still frame images presented at 30 frames/sec (fps). By comparison, human perception of optical illusions exploit gaps or expectations in our automatic cognitive visual system, such that we can perceive visual content or sensations within the image content which is often not actually present in the content itself. An optical illusion is characterized by the visual perception of image content that differ from objective reality. The information gathered by the eye is processed in the brain to give a perception that does not completely correlate with a physical measurement of the stimulus source or image. Certainly, the perception of optical illusions varies on an individual basis, depending on visual sensitivity and impairments (such as color blindness). The perception of optical illusion can also depend on age and cultural influences. For example, children tend not to perceive the well-known Ebbinghaus illusion as strongly as adults do, while non-Western and rural people, who are less accustomed to interpreting depth and flatness cues from two-dimensional (2D) images, can be less susceptible to the well-known Ponzo illusion. While human observers often respond to optical illusions attentively and with puzzlement or bemusement, some illusions can induce discomfort or nausea in certain observers.

Optical illusions can be characterized to include cognitive optical illusions, in which the eye and brain make unconscious inferences, and physiological illusions, in which the eyes and brain are affected by excessive stimulation of a specific type (e.g., brightness, tilt, color or motion). Examples of cognitive illusions include illusions of perspective, such as the Penrose Stairs or the drawings by M. C. Escher. These images exploit our expectations of how a three-dimensional view is illustrated in two-dimensions, by cleverly misapplying cues of perspective and shading to depict objects that are physically impossible. The Ponzo illusion similarly exploits our expectations that convergent lines are associated with distance; to have two lines intersecting the convergent lines appear of different length, even though their lengths are identical.

While many physiological optical illusions have been created, their perceptive impact on the human visual system has not been fully explained. The article "Uncertainty in visual processes predicts geometrical optical illusions", by Cornelia Fermüller et al. (Vision Research, Vol. 44, pp. 727-749, 2004) proposes that uncertainty or noise in the human visual system that relates to determining intensity, positions, and orientations of image features introduces systemic errors that cause perceptual anomalies compared to the original image. For example, interpretive biases relative to perception of edge elements and intersection points may explain many geometrical illusions, while biases in interpreting motion or optical flow may cause motion illusions such as the Ouchi illusion (see FIG. 6A). Generalizing, it is noted that there are many physiological optical illusions, including the well-known Hermann Grid and scintillating grid illusions, or the well-known pulsing vortex, rotating snakes, and flowing leaves illusions, that can be classified as apparent motion optical illusions which provide temporally variant sensations, such as pulsation and movement, including rotation, expansion, and contraction, that are not actually present in the images themselves, which are static in nature. Such illusions can be observed whether they are printed or presented statically on an electronic display. The temporal effects of these illusions can generally be attributed to unconscious interpretive bias in image interpretation that intersects with temporal phenomena of the human visual system such as peripheral drift, neural lags, fixation and after image effects, and saccadic eye motions.

There are also physiological optical illusions that specifically exploit attributes of human color perception, such as color and contrast adjacency effects, to fool the eye in seeing colors and grayscale patches incorrectly. The article, "A Brief Classification of Colour Illusions", by A. Kitaoka (Colour: Design & Creativity, Vol. 5, pp. 1-9, 2010), gives many examples of color perception optical illusions. For example, there are illusions of color or contrast differences that exploit adjacency interactions that are embedded in human lateral signal processing. These illusions reveal perceptual difference in color or contrast perception of an area when adjacent areas have different luminosities or color content. For example, with the Munker-White illusion, the perception of mid-tone neutral (grey) patches is altered by the presence of strong luminance shifts (darker or lighter) in neighboring image content. The Munker illusion illustrates a similar effect on color perception, where the perception of identical color patches is altered by the presence of different adjacent colors near one color patch as compared to another.

While some optical illusions, such as the Ouchi illusion or the Fraser-Wilcox illusions, are motion illusions that have a perceptual impact as black and white or grayscale images, their effects can be enhanced when color is also used. For example, A. Kitaoka has published integrated illusions, such as peripheral drift illusions and the "rotating snakes" illusion, which combines color selection with other illusions, such as the optimized Fraser-Wilcox and the Rotating Ouchi illusion to create illusions that can be more visually compelling than the black and white parent illusions. The paper "The effect of color on the optimized Fraser-Wilcox illusion", by A. Kitaoka (9th L'OREAL Art and Science of Color Prize, pp. 1-16, 2006) discusses how color and contrast manipulation can change the visual impact of the optimized Fraser-Wilcox illusion, including changing the direction and rate or magnitude of the apparent rotation of the image. The paper "Illusory motion from change over time in the response to contrast and luminance", by B. Backus et al. (Journal of Vision, Vol. 5, pp. 1055-1069, 2005) proposes that optical illusions of motion are generated when viewing static repeated asymmetric patterns due to fast and slow changes over time in the neuronal representation of contrast or luminance. The impact of other temporal illusions, such as the pulsing vortex illusion, or the Hermann grid and scintillating grid illusions, the latter of which cause the perception of pulsing at the intersections of a white (or light-colored) grid on a black background, can also be altered by changing the pattern of colors and contrast within the illusionary image.

At present, optical illusions are generally available as collections in books or on websites, and their design and physiological basis is discussed in academic papers. In general, optical illusions are primarily used to amuse or entertain viewers, including in art and architecture. With their unusual visual trickery, optical illusions often hold an observer's attention for prolonged time periods, while the observer is both amused and puzzled by the visual effects. Optical illusions are also used as tools in vision research to test or reveal the cognitive or perceptual mechanisms, interactions, or clinical deficiencies of the human visual system.

Otherwise, the human perception of optical illusions has been used for little practical effect, although their selective use as a "reverse Turing test", has been proposed in the paper "Practical Application of Visual Illusions: errare humanum est" by G. Brelstaff et al (Proc. 2nd Symposium on Applied Perception in Graphics and Visualization, p. 161, 2005). A Turing test is a test of a machine's ability to exhibit intelligent behavior, and a machine passes the test if its function, at least in a limited way, is indistinguishable from that of a human. By comparison, a reverse Turing test is a test to distinguish humans from computers and other forms of artificial or alien intelligence. The one widely used version of a reverse Turing test practiced today, involves the use of a "CAPTCHA", a "Completely Automated Public Turing test to tell Computers and Humans Apart", as a visual word recognition challenge-response test. CAPTCHAs are widely used in computing to attempt to ensure that a response is generated by a human rather than a computer. For example, as humans can readily interpret the confusing image content of a CAPTCHA, while computer algorithms have difficulty, humans can gain website access while automated programs are restrained. The Belstraff paper proposes that as humans innately can perceive optical illusions, such as Kitaoka's Rotating Snakes, and machine vision systems cannot, that the human perceptual reaction to static optical illusion images can be used to discriminate the presence of human intelligence. As a variant, it has also been proposed to use text illusions as CAPTCHAs, as human readable steganography, in which smaller case static text is hidden within larger case static text.

Thus, the opportunity exists to present, create, and alter optical illusion images for various practical and previously unforeseen effects. In particular, printed optical illusion images which are dynamic by the use of mutable inks can provide novel functional value.

SUMMARY OF THE INVENTION

The present invention represents a method for providing a printed dynamic optical illusion image having first and second illusion states, comprising:

receiving a specification of a dynamic optical illusion image having one or more mutable portions with at least two appearance states, such that when the mutable portions are in a first appearance state the optical illusion image has a first illusion state, and when the mutable portions are in a second appearance state the optical illusion image has a second illusion state, wherein changing the optical illusion image from the first illusion state to the second illusion state affects the perception of an optical illusion by a human observer; and using a printing device to print the dynamic optical illusion image on a print media using a plurality of colorants, wherein one or more of the colorants are appearance mutable colorants having spectral characteristics that can switch between a first colorant state and a second colorant state by application of an appropriate external stimulus provided by an external stimulus source, wherein the mutable portions of the optical illusion image are printed using at least one appearance mutable colorant;

wherein the printed optical illusion image can switch between the first and second illusion states by applying the appropriate external stimulus that switches the one or more appearance mutable colorants between their first and second colorant states, thereby switching the mutable portions of the printed optical illusion image between their corresponding first and second appearance states.

This invention has the advantage that the printed optical illusion image can be controlled to dynamically adjust the visual impact of the optical illusion.

It has the additional advantage that changing the visual impact of the optical illusion can be used to attract the attention of an observer.

Figure 1A:
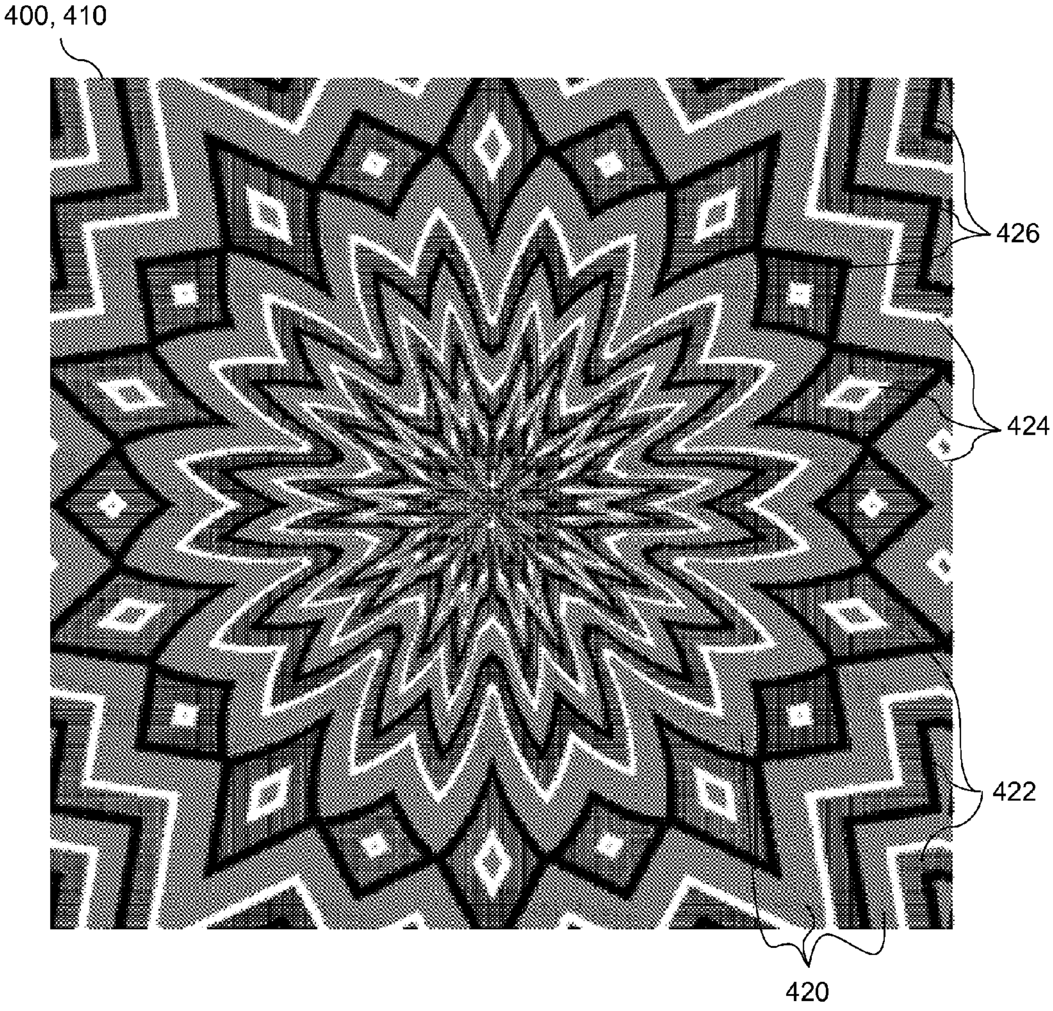
FIG. 1A depicts a gray scale rendition of a peripheral drift type physiological optical illusion image.

It is to be understood that the attached drawings are for purposes of illustrating the concepts of the invention and may not be to scale.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The present invention involves a form of intelligent printing that provides dynamically-changing printed optical illusion images. Optical illusion images have the characteristic that they are eye catching. Dynamically-changing optical illusion images are even more eye catching. This makes them valuable for applications such as advertising displays and product packaging where the goal is to draw the attention of a potential customer. They can also be useful for many other applications including watermarking, steganography, security, and the study of human perception and cognition.

Within the content of the present invention, a dynamically-changing optical illusion is a printed optical illusion image whose content is dynamically changed as a function of time, either in whole or in part, in response to an appropriate external stimulus. In particular, within an image or document including an optical illusion image, the visual design of the optical illusion image, or part thereof, including color and contrast, is changed to make the perceptual experience for an observer of the optical illusion image more or less effective, or altogether different, or to hide or reveal other image or informational content hidden in or near the optical illusion image.

In one embodiment, the external stimulus that is used to dynamically modify the printed optical illusion image is an optical radiation stimulus that provides illuminating radiation. For example, a dynamically-changing optical illusion image can be included on the packaging for a particular product. The product can then be displayed in a store and a nearby optical radiation source can be modulated, to change the appearance of the optical illusion image with time, thereby attracting the attention of a potential customer to the image and the accompanying product. In general, the visual response of observers to a dynamically-changing optical illusion image can be used to either attract their attention to the images themselves or to accompanying messages, or to distract the observers from other considerations, including accompanying messages.

The present invention will now be described with reference to FIG. 1A, which shows an illustrative optical illusion image 400. This exemplary optical illusion image 400 is a physiological optical illusion image that was adapted by the inventors from an optical illusion image entitled "The Purple Nurple Optical Illusion," created by Walter Anthony (© 2007), which is a variant of an optical illusion image created by Akiyoshi Kitaoka. In particular, this optical illusion image 400 is a "peripheral drift" apparent motion optical illusion image, which exploits attributes of human peripheral vision to create a perception of anomalous motion throughout the image. As discussed in the paper, "Phenomenal Characteristics of the Peripheral Drift Illusion" by Kitaoka et al., (Vision, Vol. 15, pp. 261-262, 2003), an optical illusion image having patterned areas with curved and fragmented edges and large luminance differences creates a physiological optical illusion having a strong perceptual impact.

In the original version of the static Walter Anthony optical illusion image 400 of FIG. 1A, image regions 420 which are reproduced as mid-tone grey were deep purple in color, and image regions 422 which are reproduced as dark grey were deep green in color. Whereas image regions 424 that are shown as white, and image regions 426 that are shown as black are reproduced essentially as originally depicted. The optical illusion image 400, as reproduced in FIG. 1A, with grays, black and whites, generally provides a very small, if any, optical illusionary effect for most observers. Some observers may perceive a slight pulsing drift motion in the center of the image. By comparison, if the image regions 420 are reproduced with dark purple, and the image regions 422 are reproduced with dark green as with the original Walter Anthony version, many observers experience a very strong optical illusion effect, where the central portion of the pattern seems to drift inwards while the outer portion of the pattern seems to drift outwards, particularly when it is viewed with peripheral vision. For some observers, the perceived motion effect can be repetitive, with jumpy transitions, where perception of the image motion seems to reset.

In one exemplary embodiment of the present invention, the optical illusion image 400 is dynamically altered to become a dynamic optical illusion image 410 wherein the image regions 420 and 422 are mutable portions that can take on a plurality of appearance states. The image regions 420 and 422 are printed with appearance mutable colorants having spectral characteristics that can be controllably switched between first colorant states and second colorant states by application of an appropriate external stimulus. For example, when the mutable colorants in the mutable portions are in their first colorant states, the image regions 420 and 422 can take on a highly chromatic appearance (e.g, dark purple and dark green, respectively), corresponding to first appearance states, such that the optical illusion image 400 takes on a first illusion state providing a strong optical illusion effect. Alternately, when the mutable colorants in the image regions 420 and 422 are in their second colorant states, the mutable image regions 420 and 422 take on second appearance states, which can be neutral, less chromatic, or chromatically shifted in appearance, thereby producing a second illusion state of the dynamic optical illusion image 400. In this second illusion state, the optical illusion image 400 can have a weak, or even negligible, optical illusion effect.

In this hierarchy of image mutability, a change in the colorant states of the mutable colorants in one or more mutable portions of a dynamic optical illusion image 400 changes the appearance of the one or more mutable portions (e.g., image regions 420 and 422) from a first appearance state to a second appearance state. This provides a corresponding change in the overall appearance of the dynamic optical illusion image. The different states of the dynamic optical illusion image can be referred to as illusion states. Changing the mutable portions from their first appearance state to their second appearance state provides a corresponding change in the dynamic optical illusion image from the first illusion state to the second illusion state. In many cases, the change in illusion states corresponds to a change in the perceptual impact of the optical illusion. In other instances, the change in the illusion states can correspond to the appearance or disappearance of hidden text, messages, images, or codes within or adjacent to the optical illusion portion of the dynamic optical illusion image (with or without changing the state or perceptual impact of the optical illusion). As another example, a change in the illusion states can also leave a primary optical illusion image intact, but add a secondary illusion effect to the dynamic optical illusion image 400. Changes in the perceptual impact of the optical illusion can also occur in combination with changes in the appearance of hidden content. The changes in illusion states can be either subtle or dramatic. In some cases, the entire dynamic optical illusion image may be a mutable portion such that the entire image area can be changed when the colorant states of the mutable colorants are changed.

In the above example, the spectral absorption characteristics (or likewise, the spectral reflectance characteristics or the spectral transmittance characteristics) of the mutable colorants is controlled between a low-saturation state and a high saturation state. By adjusting the shape or amplitude of the spectral absorption characteristics, it is possible to adjust various color appearance characteristics of the mutable portions of the optical illusion image, such as the hue, saturation or lightness. In some embodiments, the spectral fluorescence characteristics of the mutable colorants can be controlled such that the mutable colorants have more or less fluorescence, or fluoresce with different spectral absorption/emission characteristics. In other embodiments, the mutable portions of the optical illusion image can be controlled to adjust image attributes such as image contrast or image content.

As another variant, rather than controlling the image regions 420 and 422 between first colorant states having a highly chromatic appearance and second colorant states having a neutral appearance, one or both of the image regions 420 and 422 can be controlled between two chromatic colorant states. For example, the image regions 420 can be controlled between a first colorant state and a second green colorant state which matches the green color present in image regions 422. When the image regions 420 are in the second green colorant state, the optical illusion image 400 exhibits a greatly reduced perceptual optical illusion effect relative to the case when the image regions 420 are in the first purple colorant state, similar to the visual effect produces when the image regions 420 and 422 are controlled to have a neutral appearance. For example, it has been found that an intermediate level of the optical illusion effect can be observed if the colorant state for the image regions 420 is controlled to provide a brown colorant state, whereas a strong level of the optical illusion effect can be observed if the colorant state for the image regions 420 is controlled to provide a red colorant state. Therefore, it can be seen that by proper selection of an appropriate pair of colorant states for one or more of the image regions in the optical illusion image 400, it is possible to control the perceptual impact of the optical illusion effect to produce the desired results. Additionally, although the changes to the mutable portions can change image content of a optical illusion portion of a dynamic optical illusion image, such as by changing its perceptual impact, such changes can provide other effects, including providing alternate or secondary optical illusions (such as causing a second optical illusion portion to appear) or altering various appearance attributes of the optical illusion (such as adding an illusionary scintillation effect to an existing optical illusion image) or hiding or revealing hidden text or patterns.

Figure 2A:
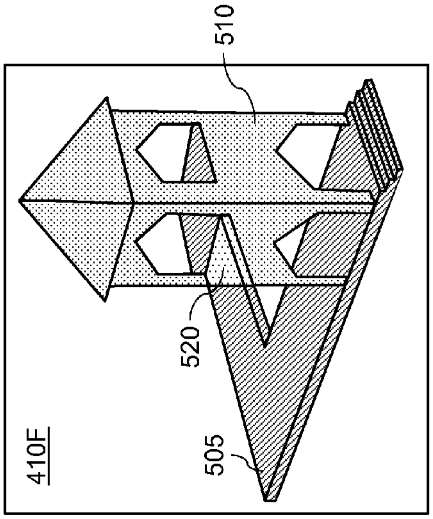
FIGS. 2A-2C depict a cognitive optical illusion image.
Figure 2B:
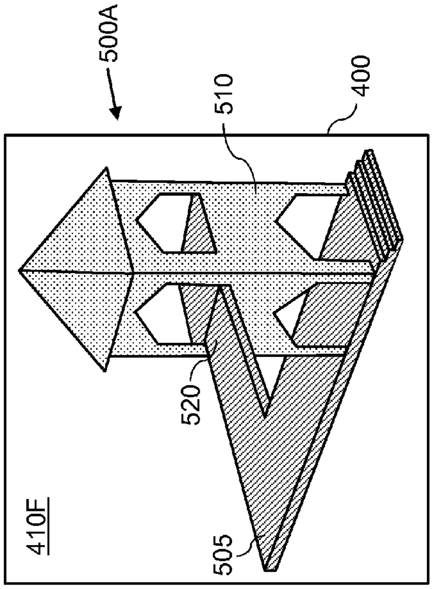
Figure 2C:
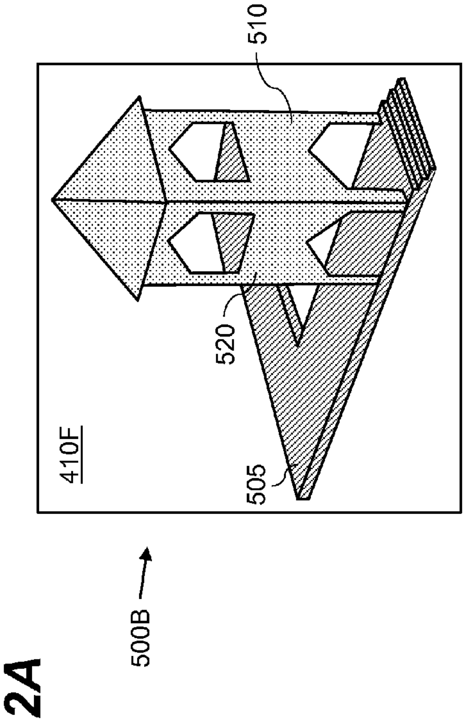

To further illustrate the effect of selectively altering optical illusion images, a cognitive dynamic optical illusion image 410F in the style of M. C. Escher is shown in FIGS. 2A-2C, having a two-story gazebo structure 510 and a walkway 505. In particular, FIG. 2B illustrates a classical M. C. Escher style optical illusion 400 of an impossible building in which the walkway 505 appears to be traverse in a contiguous fashion from the lower tower level to the upper tower level of the gazebo structure 510, even though ramps or stairs are lacking In FIG. 2A, a dynamic optical illusion image 410F includes a mutable portion 520 that can be controllably switched between a first appearance state where it matches the color of the walkway 505 and a second appearance state where it matches the color of the gazebo structure 510. In this way, the cognitive optical illusion switches between illusion states by application of an external stimulus.

In that context, FIG. 2B illustrates the appearance of the dynamic optical illusion image 410F when the mutable portion 520 has been controlled to match the color of the walkway thereby providing a first illusion state 500A. In this first illusion state 500A, the dynamic optical illusion image 410F depicts an impossible structure where the continuous walkway 505 presents an impossible structure.

FIG. 2C illustrates the appearance of the dynamic optical illusion image 410F when the mutable portion 520 has been controlled such that the resulting appearance state matches the color of the gazebo structure 510 thereby providing a second illusion state 500B. In this second illusion state 500B, the apparent paradox is broken so that the walkway 505 no longer appears to connect to the second story of the gazebo structure 510. The walkway 505 appears to always be on ground level and pass behind the gazebo structure 510.

Figure 3A:
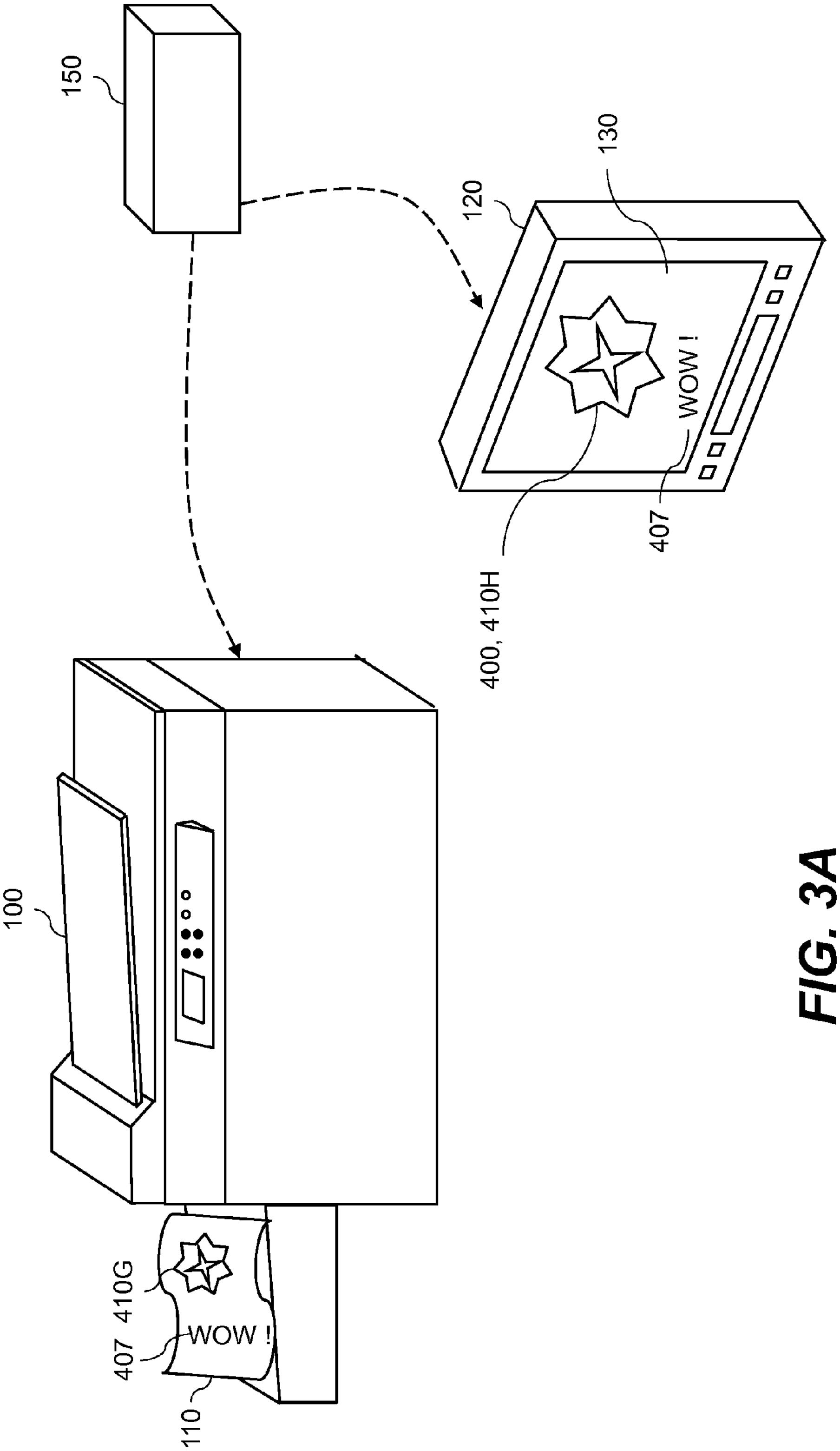
FIG. 3A depicts a system for producing a printed optical illusion image in accordance with the present invention.

Accordingly, it is seen that careful adjustment of an image can introduce (or remove) an optical illusion, or can alter the perceptual impact of an optical illusion for an observer. Specifically, portions of an optical illusion image can be adjusted to affect any of its attributes, including but not limited to content, color (hue, saturation or lightness) and contrast to enhance or reduce the illusionary effect. To that end, FIG. 3A depicts an exemplary system in which a data processor 150 is connected to an electronic display 120 having a screen 130 and a printer 100 for printing on print media 110 using a plurality of colorants, including one or more mutable colorants having spectral characteristics that can be controllably switched between a first colorant state and a second colorant state. The plurality of colorants will also generally include one or more conventional immutable colorants whose spectral characteristics are static. The data processor 150 can provide image data to the display 120 or the printer 100, including image data for optical illusion images 400 or dynamic optical illusion images 410. The dynamic optical illusion images 410, having one or more mutable portions that can be altered to dynamically change the appearance or presence of the optical illusion, can be provided to the printer 100 as printed dynamic optical illusion images 410G or to the display 120 as dynamic optical illusion images 410H. The dynamic optical illusion images 410G and 410H can also include adjacent image content 407 that may or may not be mutable. This system can include other components such as processor-accessible memory, communications controllers, input/output devices, and other hardware not shown.

When the dynamic optical illusion image 410H is presented on the display 120, the mutable portions can be controlled by dynamically switching back and forth between two different versions of the optical illusion image where the mutable portions have been adjusted appropriately. Alternately, the mutable portions of the image can be adjusted in real time by altering the content of the memory used to store the image data for the dynamic optical illusion image 410H. The display 120 can be used for a user to preview the appearance of the dynamic optical illusion image 410H during the process of designing and optimizing the optical illusion effect, and for example, compare it to the original static optical illusion image 400, to determine if the desired transformation and perceptual effects are being achieved. Preferably, the previewed dynamic optical illusion image 410H is designed to simulate the appearance of a printed dynamic optical illusion image 410G that will be produced by the printer 100, accounting for the spectral characteristics of the mutable and immutable colorants available in the printer.

In the case of printed content, most colorants such as inks, toners, pigments, dyes, or other materials that can be printed onto the print media 110 to provide informational or image content are not dynamic once they have been deposited and cured or dried. Normal colorants have static spectra characteristics, aside from being subject to degradation, such as fade due to UV exposure, or other abuse (such as smearing). Thus, it is particularly difficult to dynamically change printed content.

There are however certain special classes of mutable colorants that can be printed, then controllably stimulated to induce changes in their spectral characteristics. Mutable colorants are chromogenic materials, which are materials that change their color upon application of an appropriate stimulus. Types of mutable colorants include thermochromic colorants, photochromic colorants, and electrochromic colorants. Such colorants can be controllably switched between a first colorant state and a second colorant state by application of an appropriate external stimulus. Thermochromic colorants have spectral characteristics that can be controllably switch by a thermal stimulus. Photochromic colorants have spectral characteristics that can be controllably switch by an optical radiation stimulus. Likewise, electrochromic colorants can reversibly change between coloration states and transparency (changed spectral characteristics) when subjected to an electrical stimulus such as an applied voltage. However, thermochromic and photochromic colorants have the advantage that they enable a dynamic response without requiring the presence of imbedded or printed electronics. There are a wide variety of thermochromic and photochromic colorants that are commercially available, including both reversible colorants that can be cycled back and forth between the different colorant states, and irreversible colorants that can only undergo a single state change (e.g., from clear to colored).

It is noted that other forms of mutable colorants, such as fluorescent colorants, photoluminous (glow-in-the dark) colorants, piezochromic (pressure sensitive) colorants, hydrochromic (moisture sensitive) colorants, or halochromic (pH sensitive) colorants, can also be used for various embodiments. In some applications, the mutable colorants can be mixed or over-coated with other colorants or protective materials.

Thermochromic inks that can be used for mutable colorants in various embodiments of the present invention are commercially available from many companies, including Chromatic Technologies International of Colorado Springs, Colo., LCR Hallcrest of Glenview, Ill., and Printcolor Screen Ltd. of Berikon, Switzerland. Typically, thermochromic inks have a first colorant state producing a first visible color at a nominal temperature level. Then when the thermochromic inks are heated (or cooled) by application of an appropriate thermal stimulus their spectral characteristics change to a second colorant state producing a second visible color. In some cases, one of the colorant states may be a clear (i.e., invisible) colorant state where only a minimal amount of the incident light is absorbed by the colorant. Some common types of thermochromic dyes are based on mixtures of leuco dyes with suitable other chemicals that display a color change (usually between the colorless leuco form and the colored form) in dependence on temperature.

As an example, LCR Hallcrest offers a range of mixed temperature thermochromic inks that respond under different temperature conditions. These include cold activated thermochromic inks which undergo a color change when cooled (progress from clear to colored at or below 15° C.), thermochromic inks that change color at body temperatures (progress from colored to clear at 31° C.), and thermochromic inks that change color in response to high temperatures (progress from colored to clear at 47° C.).

Photochromic inks are also available from many companies, including Chromatic Technologies International and LCR Hallcrest. Typically photochromic inks are invisible (clear or colorless) or lightly colored (nearly colorless or pale) until illuminated with light (typically UV or short wavelength blue), and then become fully colored colors which are much more saturated colors, including pastel or fully saturated colors, once stimulated with the appropriate light dosage (intensity, wavelength or spectrum, and time).

Photochromic and thermochromic color changes are distinct from fluorescence induced color changes, as the color changes do not require a continuous stimulus, but are metastable and can linger over extended periods of time (e.g., minutes or hours). Response times vary, but the changes can be relatively quick (within seconds or less). Some photochromic dyes have been experimentally used as optical switches with switching times of ~1 μs. For example, some LCR Hallcrest photochromic inks become fully colored colors that are intensely colored after only 15 seconds exposure to direct sunshine and then return to clear after about 5 minutes indoors. Photochromic inks can fade to clear at various rates. For example, the LCR Hallcrest orange and yellow inks are relatively slow to return back from their colored state to their clear state. The prolonged or metastable color states can be particularly advantageous for the present invention, because typically humans perceive optical illusion images more slowly than they do normal image content. Additionally, for many applications, such as smart packaging, the temporal pattern of an occasional stimulus and a prolonged response can be advantageous. The ink lifetime can be limited because of the degradation from solar UV exposure, but UV protected inks are becoming available.

While thermochromic and photochromic inks often produce pastel or unsaturated colors, they still span a range of hues, as for example, thermochromic inks can change from colorless, or near colorless, states to fully colored colors that are red, orange, green, blue, purple, magenta, or other colors, depending on the formulation. Photochromic inks can experience similar color changes. The color gamut which can be achieved can be expanded by printing these mutable inks in combination with normal non-mutable inks Published papers, such as "Chromatic Properties of Thermochromic Inks", by L. Johansson (TAGA Proceedings, 2006) and "Thermochromic Inks-Dynamic Colour Possibilities", by R.

Kulcar et al., (Proc. CREATE Conference, pp. 202-206, 2010), provide some detail about the color changes obtained with these types of inks during screen printing experiments.

Examples of electrochromic colorants that could be used in accordance with the present invention would include NanoChromics inks available from NTERA of Philadelphia, Pa. These inks combine nanocrystalline and color change materials for applications such as smart packaging and flexible displays.

Figure 4A:
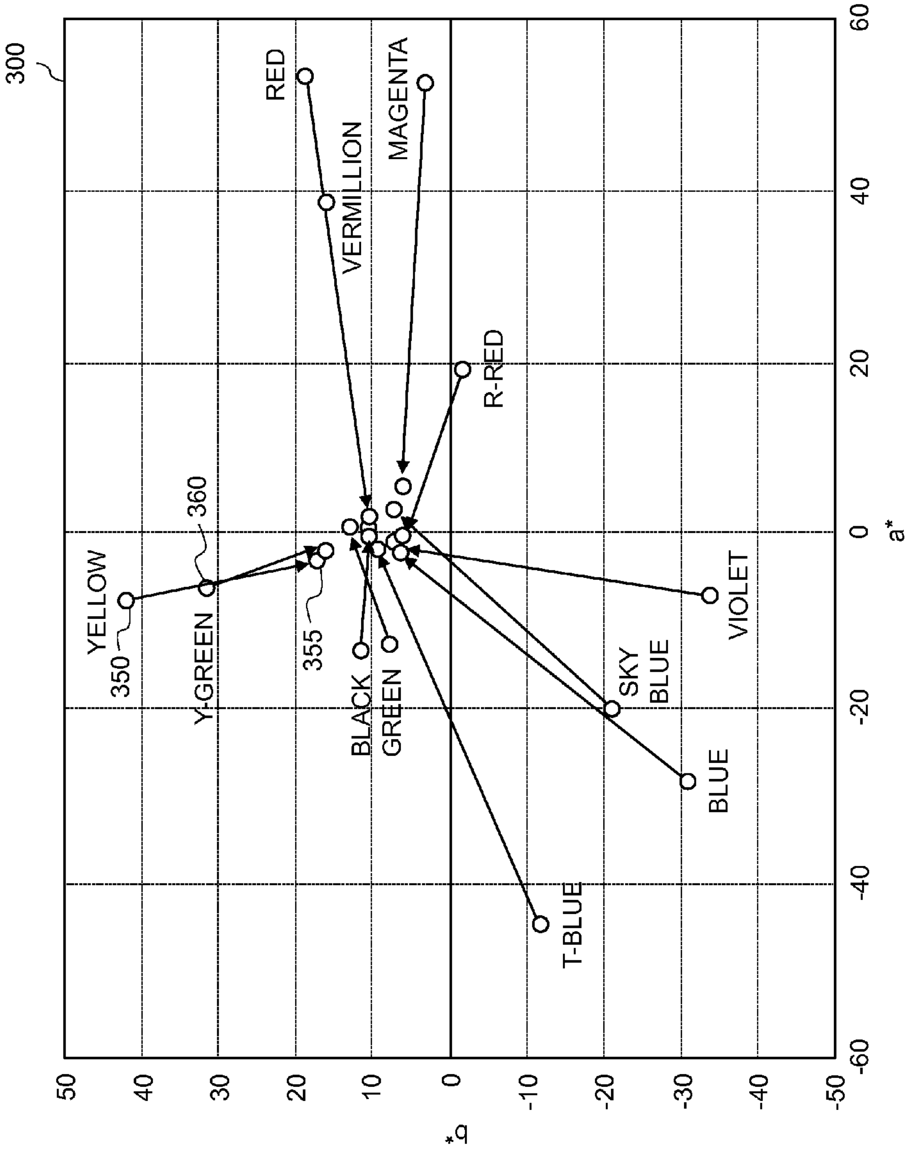
FIG. 4A (PRIOR ART)
FIGS. 4A, 4B and 4C depict color changes associated with exemplary thermochromic inks.

FIG. 4A, which is taken from the Johansson paper, shows a graph 300 illustrating a range of color changes, as characterized in the well-known CIELAB color space, that are achieved by thermochromic inks from New Prismatic Enterprise Co. Ltd. of Taiwan for yellow, green, red, blue, violet, and other color inks The arrows indicate the direction of color shift as the ink samples are heated and progress between endpoint colors, from the fully colored color of a first colorant state 350 to nearly colorless color at a second colorant state 355. In FIG. 4A, an example using a Yellow ink or colorant is shown, which also has an intermediate colorant state 360 in addition to the endpoint colors.

Figure 4B:
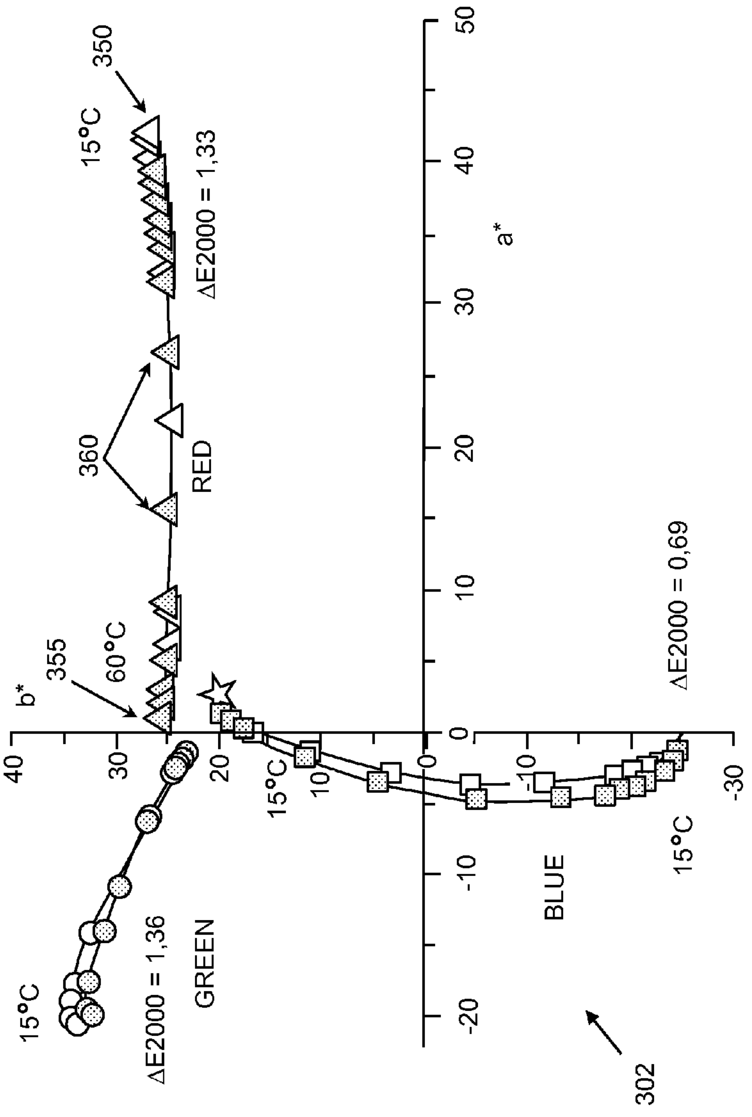
FIG. 4B (PRIOR ART)

FIG. 4B, which is taken from the Kulcar paper, shows a graph 302 illustrating trajectories the color of reversible red, blue and green thermochromic inks as a function of temperature, using inks from Coates Screen Inks GmBh (Germany) and Sicpa (Switzerland). As can be seen from both FIGS. 4A and 4B, reversible thermochromic inks typically lose color during heating (progressing from first colorant state 350 through intermediate color states 360 to second colorant state 355) and regain it during cooling. At the first colorant state 350, the cold temperature colors or fully colored colors can be pastel in color, or fully saturated colors (or nearly so), depending on the colorant. Both Figures also indicate that decolorization may not be complete, and that typically a pale or yellowish tint remains in the heated state or second colorant state 355. The gap between the cooling and heating color trajectories in FIG. 4B is indicative of color hysteresis.

Figure 4C:
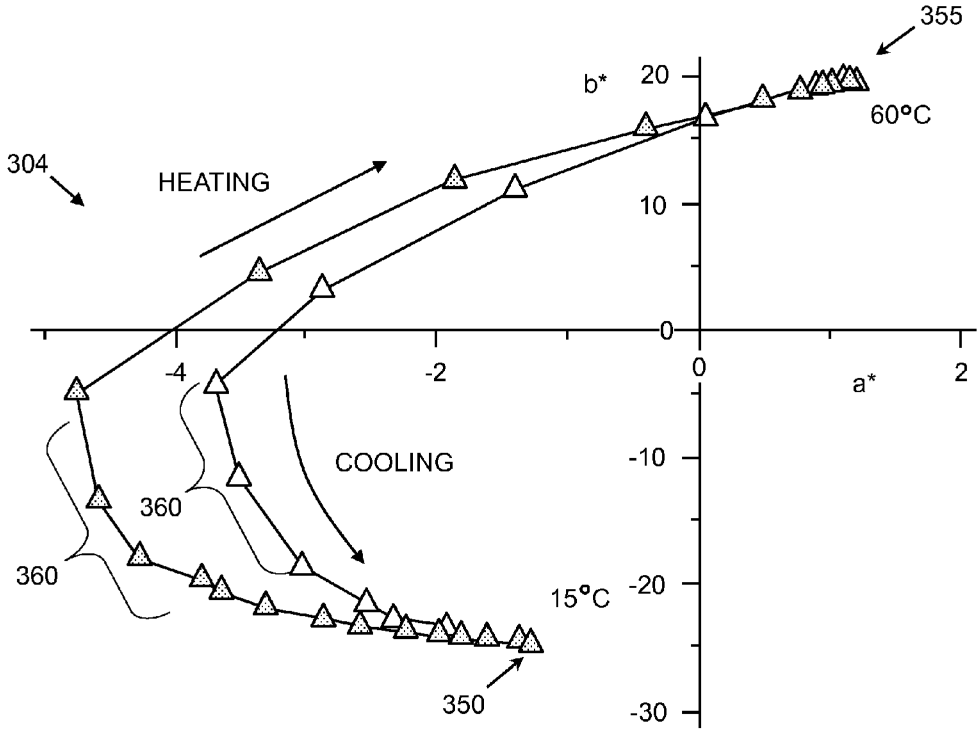
FIG. 4C (PRIOR ART)

FIG. 4C, also reproduced from Kulcar, shows a scale expanded graph 304 for the blue ink that illustrates the hysteresis experienced by reversible thermochromic inks in greater detail. This hysteresis can be substantial, as color trajectories traced out from a first colorant state 350 (cool) to a second colorant state 355 (heated) through the CIELAB color space pass through different intermediate color states 360 during heating than during cooling. Thus, the visibility of color and image content can be manipulated to provide intermediate color states, not just the endpoint color states (such as hot and cold temperatures). Thus intermediate appearance states, involving illusionary image content or hidden patterns or messages, and intermediate illusion states, can occur. However, the hysteresis can make the use of intermediate colorant states 360 more difficult or predictable. For this reason, the use of controlled stimulus, whether to consistently drive the mutable colorants to endpoint color states, or reliably to intermediate colorant states 360) or color matches between various mutable image portions or between mutable and immutable image portions, can be valuable. The control of stimulus dosage to attain only endpoint color states is likely less demanding than the control required to reliably provide intermediate color states, within appropriate colorimetric tolerances. It is noted that the responsiveness of thermochromic inks can also be shown in other ways, including as graphs in lightness (L*) vs. temperature. For brevity, comparable color space diagrams and response curves for photochromic inks are not provided.

Figure 4D:
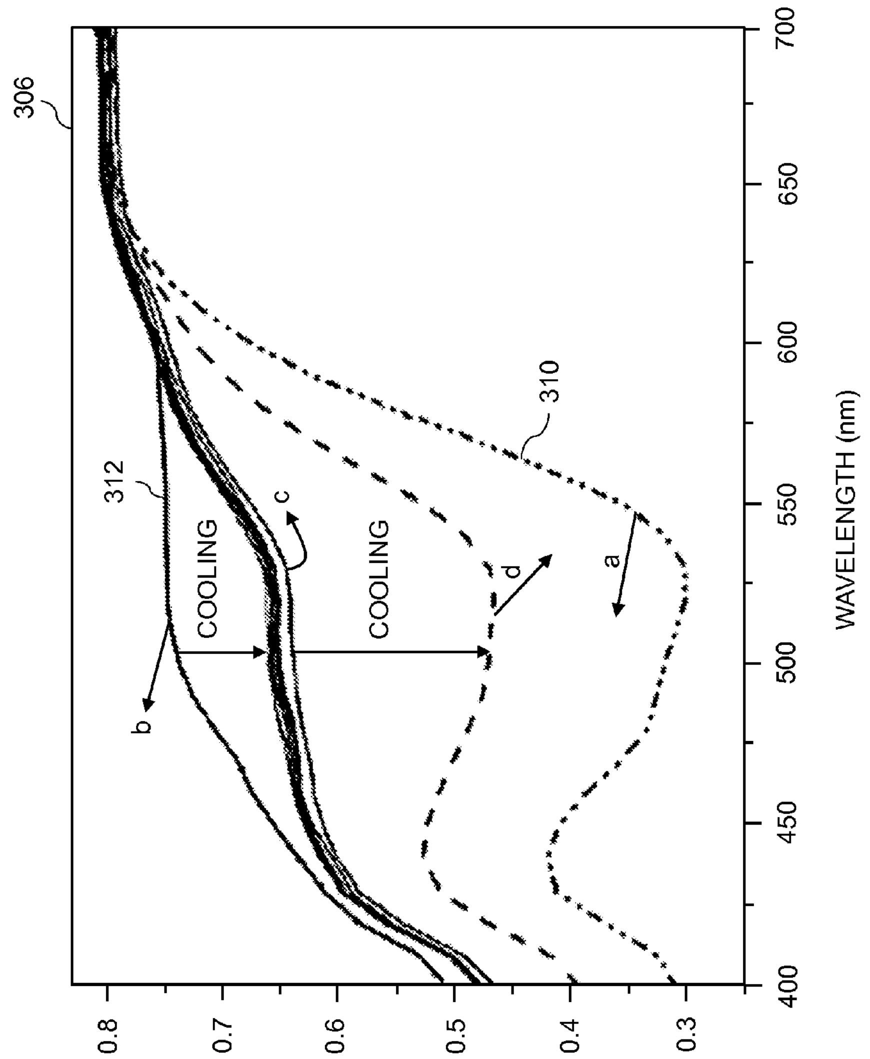
FIG. 4D (PRIOR ART)
FIG. 4D depicts spectral changes associated with an exemplary thermochromic ink.

The color changes shown in FIGS. 4A-4C occur because of changes in spectral absorption/reflectance/transmittance characteristics of the inks in response to the applied thermal stimulus. For, example, the paper "Colorimetric properties of reversible thermochromic printing inks", by Kulcar et al. (Dyes and Pigments, Vol. 86, pp. 271-277, 2010), provides spectral data for a red thermochromic ink from Coates Screen GmBh. FIG. 4D shows a graph 306 depicting changes in the ink spectral reflectance for this thermochromic ink as a function of temperature. At an initial temperature (a), the unactivated spectral reflectance profile 310 is high in the red, and low in the green and blue; this corresponds to a red color appearance for a first colorant state 350. When the ink is heated to state (b), the activated spectral reflectance profile 312 is high across the whole visible range, although it is slightly lower in the blue. In this state the ink has a clear appearance (with a slight yellow tint) for a second colorant state 355. When the ink is cooled to state (c), which is still warmer than state (a), but is somewhat cooler than state (b), the green reflectance has dropped moderately (corresponding to an increase in the green spectral absorbance). In this state, the ink has an intermediate colorant state 360 that is light yellow to light orange in appearance. After further cooling to state (d), the reflectance in the blue and green has dropped significantly, and the intermediate colorant state 360 has a more pronounced reddish coloration.

Figure 4E:
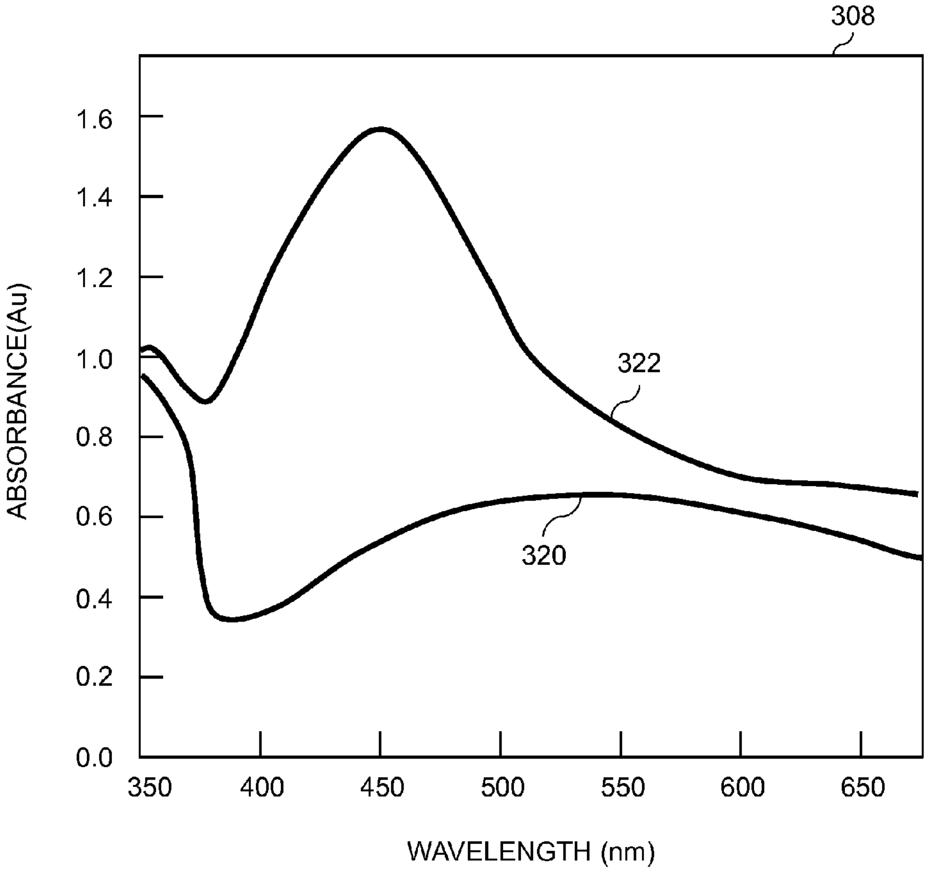
FIG. 4E (PRIOR ART)
FIG. 4E depicts spectral changes associated with an exemplary photochromic ink.

As another example, FIG. 4E shows a graph 308 depicting the changes in light absorption for the Reversacol Flame photochromic ink from Vivimed Labs of Hyberbad, India. It can be seen that an unactivated spectral absorption profile 320 is quite flat and low (having a near neutral tint), which equates to an unactivated resting state, or first colorant state 350, of the ink. With application of an ultraviolet optical radiation stimulus at a wavelength of 380 nm, the high UV absorption of the ink will produce a strong activation of the dye. Once activated, maximum absorption occurs at around 475 nm in the blue region of the spectrum, producing a new activated spectral absorption profile 322. Removal of the blue fraction of the spectrum by the dye results in the ink having a second colorant state 355 that has a red-orange color.

Thus, it can be seen that chromogenic materials or mutable colorants, including thermochromic and photochromic inks, can produce a wide range of controllable color changes when used individually. The range of color change can be expanded when these inks are used in combination, including combining multiple types of thermochromic or photochromic inks (either reversible or irreversible), or combining photochromic inks with thermochromic inks, or combining mutable inks or with normal non-mutable inks These abilities can be used for the present purpose to create and controllably alter mutable portions of dynamic optical illusion images 410 between multiple appearance states, thereby providing one or more illusion states, such that the perceptual impact of an optical illusion image 400 can be changed for an observer. Depending on the properties of the respective inks, combination printing can be achieved by over-coating or patterning, such as with halftone or continuous tone dots. Other properties, such as dot gain differences or transparency, can determine which inks are preferentially printed first, and which are printed later, and are nearer the top surface of the printed surface. It should be understood that the term "ink", for the purposes of the present invention, is a pigmented liquid or paste used especially for writing or printing, which includes a colorant, a solvent, a vehicle and additives, as appropriate. Mutable inks are often micro-encapsulated with a color former (dye), a color developer within the microcapsules, and binders between them. Other types of mutable colorants can also be used in accordance with the present invention, such as mutable toners for use in electrophotographic printing systems.

Returning to a discussion of FIG. 3A, the system having the data processor 150 is connected to the printer 100 to produce a printed page including the printed dynamic optical illusion image 410G on the print media 110. The printer uses a plurality of colorants, including one or more appearance mutable colorants having spectral characteristics that can be controllably switched between a plurality of different colorant states by application of an appropriate external stimulus. The data processor 150 receives image data specifying the image content for the dynamic optical illusion image 410H. This mutable optical illusion image can be designed, using knowledge of image science and color science to provide the image content including one or more mutable portions that will have the intended appearance for the different illusion states associated with the different colorant states of the one or more mutable colorants. The data processor 150 determines printer image data specifying the amounts of the various colorants as a function of position that is then provided to the printer 100 to produce the printed dynamic optical illusion image 410G. The printer image data is designed to provide the desired image content producing the intended illusion effects, while achieving appropriate image quality attributes, including color matches, color gamut, color accuracy, the presence of intermediate colors, metamerism, resolution, or contrast. The image quality attributes can be described by various parameters, including color space coordinates and just noticeable differences (JNDs). The printed dynamic optical illusion images 410G can be controlled using the appropriate external stimulus to provide the desired illusion states when the mutable inks are at endpoint color states (e.g., first colorant state 350 and second colorant state 355 in FIG. 4A), intermediate color states (e.g., intermediate colorant state 360 in FIG. 4A), or combinations thereof.

Figure 3B:
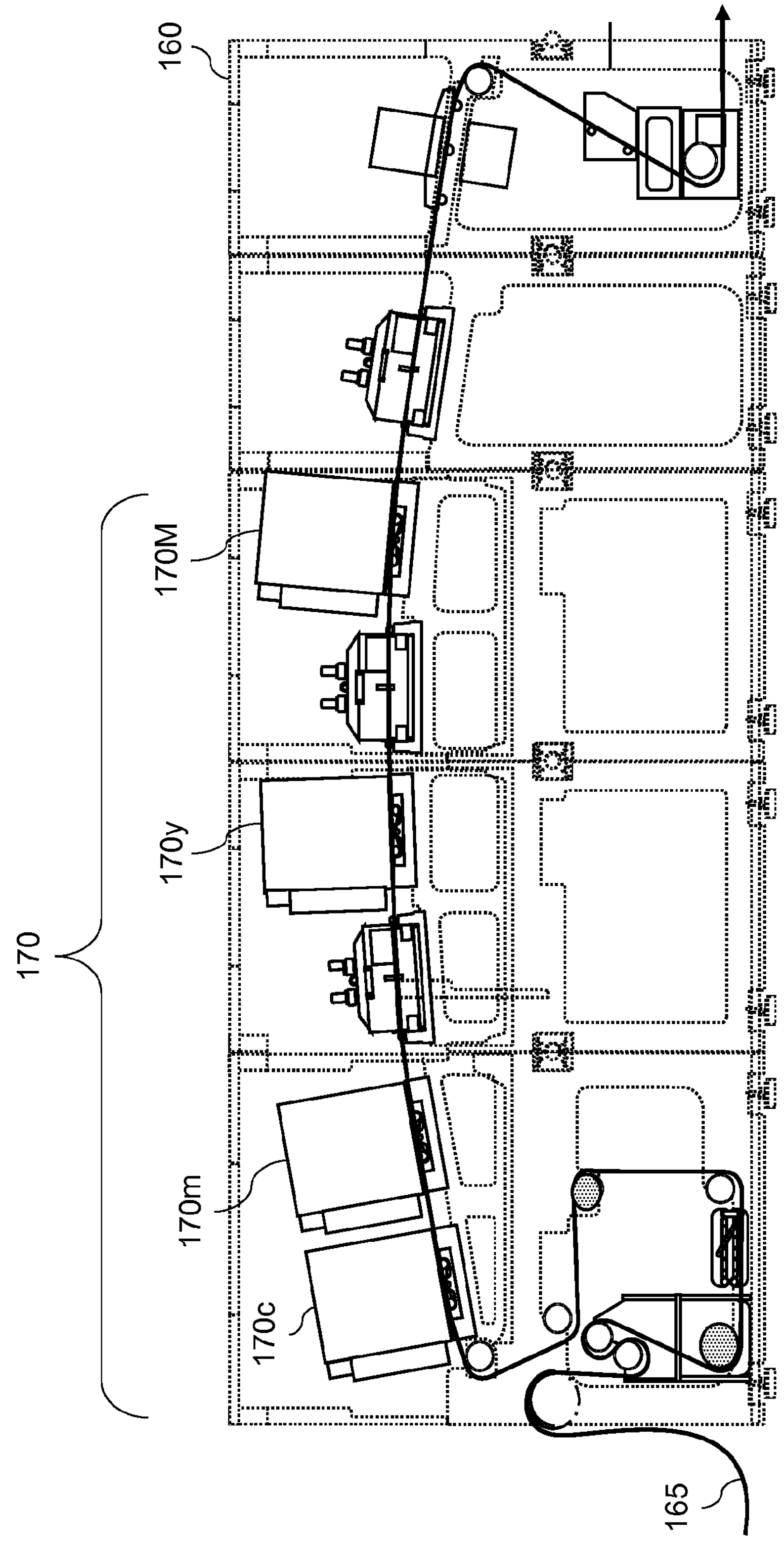
FIG. 3B depicts alternate high-speed printer that can be used in the system of FIG. 3A.

The printer 100 shown in FIG. 3A can be a desktop or mid-market printer, such as an inkjet printer that uses one or more inkjet print heads (not shown) to print on the print media 110, which can include cut sheet paper. As another example, FIG. 3B depicts a high speed printer 160 that deposits ink on a fast moving web print media 165. Although the web print media 165 is generally meant to be paper, it should be understood that the method of the present invention for creating and using printed dynamic optical illusion images can print the images on any appropriate type of media or substrate, which include, but are not limited to, paper, cardboard, cloth or other textiles, plastic or polymer surfaces or substrates (transparent or opaque), glass, metal sheet, multi-layer composite materials, or variations and combinations thereof.

Figure 3C:
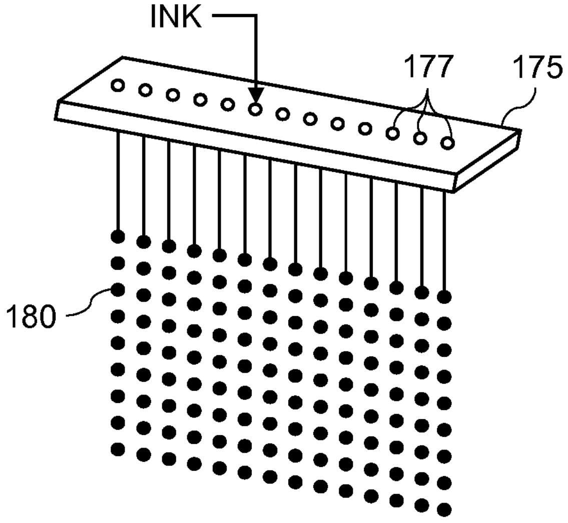
FIG. 3C depicts an ink jet print head that can be used in the printers of FIG. 3A or 3B.

As depicted, the exemplary printer 160 has 4 print stations 170, although it may have more. In this example, the first three print stations 170$c$, 170$m$, and 170$y$, apply cyan, magenta, and yellow inks, respectively, and the fourth print station 170M applies a mutable ink. Alternately, these print stations can deposit different colored inks, such as black, red, green, or blue inks In some embodiments, one or more additional print stations can be added to apply additional inks such as a black ink or another mutable ink. Mutable ink is applied by one or more print stations 170M, which can apply any type of mutable ink, including the thermochromic or photochromic inks that were discussed earlier. FIG. 3C then shows a simplified ink jet print head 175 that can be provided within a print station 170 for the case where the printer 160 is a continuous inkjet printer. The print head 175 includes multiple nozzles 177 arranged in an array. For continuous inkjet printers, ink flows continuously through the print head and provides streams of fluid, which break into ink droplets 180. The droplets are either allowed to fall onto the web print media 165 (FIG. 3B), or are deflected to an ink catcher for locations where no ink should be applied to the printed page.

In other embodiments, the print head 175 can be a drop-on-demand print head which only produces drops as they are needed. In some configurations of the printer 160 in FIG. 3B, some of the print stations 170 can use continuous-type inkjet print heads 175, while other print stations can use drop-on-demand print heads 175. For example, the print stations 170$c$, 170$m$ and 170$y$ can use continuous-type inkjet print heads, while the print station 170M can use a plurality of drop-on-demand print heads, such as, for example, one or more for each type of mutable ink to be applied. As mutable inks tend to have higher viscosity than many normal (non-mutable) process inks, the print heads 175 for print station 170M are more likely to have ink ejector mechanisms, such as ones having piezo actuators, to provide the greater force necessary to emit such inks However, it should be understood that multiple kinds of inks, including both normal and mutable (reversible or irreversible) inks, can also be emitted by the same nozzle, or printed with the same applicator, either simultaneously as mixtures or sequentially. It should also be understood that while FIG. 3C specifically illustrates the use of ink jet printing technology; other technologies can also be used to apply the mutable inks for the purposes of the present invention. For example, printer 160 can use a variety of printing technologies including electrophotographic, offset litho, dry offset, letterpress, gravure, flexography, or screen printing.

Returning to a discussion of FIG. 1A, which depicts a previously discussed optical illusion image 400. As was mentioned earlier, in one exemplary embodiment, the optical illusion image 400 is a printed optical illusion image, and particularly a dynamic optical illusion image 410 with image regions 420 and 422 that are mutable portions printed with appearance mutable colorants. According to one embodiment, the black image regions 426 are printed with an immutable black colorant and no colorants are printed in the white image regions 424. For example, the mutable image regions 420 are printed with a light gray color using the immutable black colorant, and are overprinted with a first mutable colorant that can be controllably switched between a clear colorant state and a purple colorant state (e.g., the Violet mutable colorant shown in FIG. 4A). Similarly, the mutable image regions 422 are printed with a mid gray color using the immutable black colorant, and are overprinted with a second mutable colorant that can be controllably switched between a clear colorant state and a green colorant state (e.g., the Green mutable colorant shown in FIG. 4A). The mutable colorants are changed between the first and second states by application of an appropriate external stimulus. The external stimulus, for example, can be a thermal stimulus for the case where the mutable colorants are thermochromic colorants, or an optical radiation stimulus for the case where the mutable colorants are photochromic colorants. When the mutable colorants are in their clear colorant states, the image regions 420 and 422 will have a neutral appearance, and the optical illusion image 400 will take on a first illusion state having a very weak visual impact for a typical observer. But when the mutable colorants are switched to their purple and green colorant states, the optical illusion image 400 will take on a second illusion state having a strong visual impact for a typical observer. As another example, image regions 420 and 422 can be printed with immutable colorants having a light or mid tone blue color, and over printed with mutable colorants such as the Yellow and Red colorants of FIG. 4A. When the mutable inks are in their colored states, over the underlying blue colorants, then purple and green colorant states can appear in image regions 420 and 422 respectively.

Figure 1B:
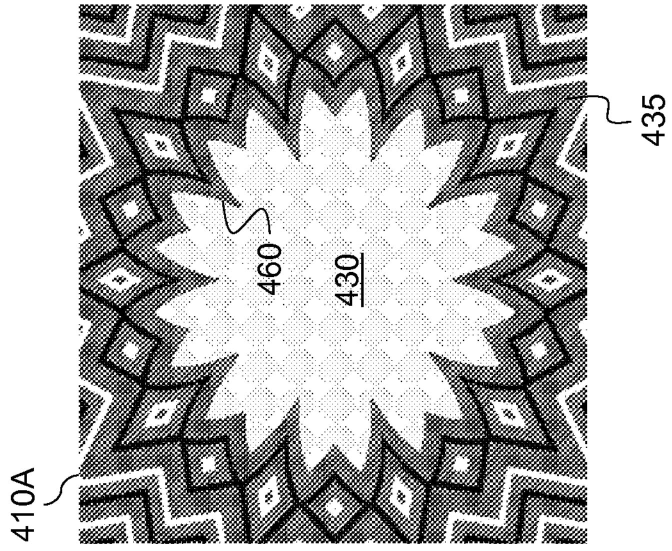
FIGS. 1B-1F depict various types of dynamic optical illusion images produced in accordance with the present invention.

As another embodiment of the present invention, a dynamic optical illusion image 410A is shown in FIG. 1B. In this example, the printed optical illusion image includes a central mutable portion 430 that is printed with mutable colorants, and an outer immutable portion 435 that is printed with conventional immutable colorants. In this case, the shape of the central mutable portion 430 follows a natural contour 460 in the optical illusion pattern, although this is not a requirement. When the mutable portion 430 is in a first appearance state, the mutable colorants can be either colorless (as shown in FIG. 1B) or colored, providing a first illusion state where the optical illusion has a very weak visual impact for a typical observer. When the mutable inks are switched to take on second colorant states, the mutable portion 430 takes on a second appearance state, which can correspond to a second illusion state where the optical illusion has a strong visual impact for a typical observer. For example, the central mutable portion 430 can be printed with one or more photochromic inks that are colorless, or nearly so, when unactivated. Then when an activating optical radiation dosage is applied, these inks transition to colored states, completing the optical illusion image. As a result, in one illusion state, the optical illusion within the dynamic optical illusion image 410A will have a strong visual impact for a typical observer. In particular, the anomalous motion that was described earlier can be perceived in the dynamic optical illusion image 410A. In the other illusion state, the visual impact of the optical illusion is modified or eliminated, depending on the color and contrast content changes, particularly in the central mutable portion 430.

In another embodiment, the central mutable portion 430 of the dynamic optical illusion image 410A in FIG. 1B can be printed with a combination of mutable and immutable colorants. For example, as was discussed earlier with reference to FIG. 1A, the mutable portion can be printed using a neutral pattern printed with an immutable black ink or blue ink overlaid with mutable inks that can be switched between a clear state and a colored state. In this way, the color content of the mutable portion 430 can be more or less visible depending on the state of the accompanying mutable inks.

Figure 1C:
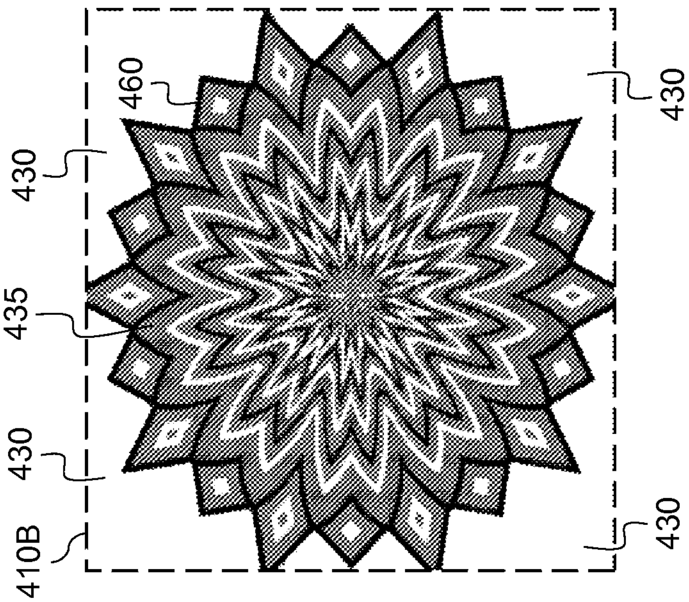

FIG. 1C depicts another exemplary dynamic optical illusion image 410B, which is similar to the dynamic optical illusion image 410A of FIG. 1B, except that the positions of the mutable portion 430 and the immutable portion 435 have been reversed. In this case the central immutable portion 435 is printed with conventional immutable colorants, and the outer mutable portions 430 or corners are printed using mutable colorants, or combinations of mutable and immutable colorants. In this case, the transition between mutable and immutable image regions follows part of the image pattern or contours 460. In a first illusion state, the mutable colorants can be clear (as shown in FIG. 1B) or can take on some other first state colors where the optical illusion has a first visual impact. In a second illusion state, the mutable inks are controllably switched to take on second state colors where the optical illusion has a different visual impact. Dynamically modifying the mutable colorants in this way can significantly affect the perception of the anomalous motion present in the original Walter Anthony optical illusion image because the peripheral image content is changing. For simplicity, the examples of FIGS. 1B and 1C show portions of the original illusion image being removed. However, it should be understood that changes in the illusion image content can be more subtle, and that the illusion pattern, contours, or spatial frequencies of patterns can also be changed.

Figure 1D:
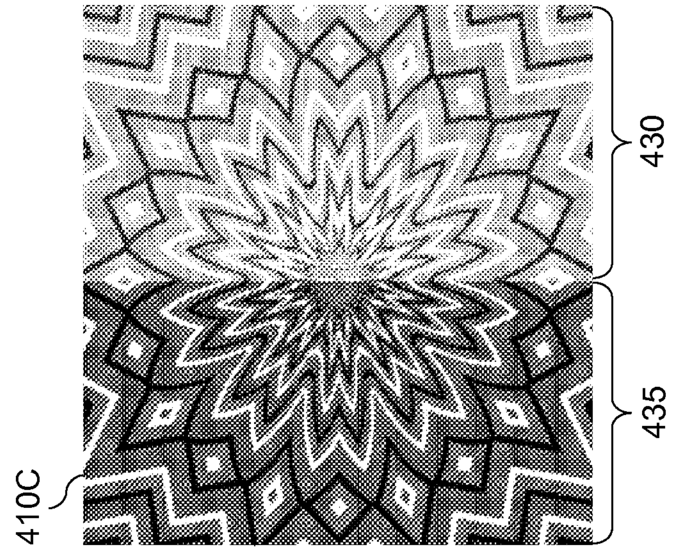

FIG. 1D depicts another exemplary dynamic optical illusion image 410C, where a left immutable portion 435 is printed with conventional immutable colorants, and a right mutable portion 430 is printed using mutable colorants, or combinations of mutable and immutable colorants. In this case, the boundary between the mutable portion 430 and the immutable portion 435 does not follow natural contours in the optical illusion pattern. In one embodiment, the mutable portion 430 is printed with reversible thermochromic color change inks that vanish when activated to temperatures above body temperature by an applied heat stimulus, thereby interfering with the visual impact of the optical illusion. When the dynamic optical illusion image 410C is subsequently cooled, the visual impact of the optical illusion is restored. Dynamic optical illusion images 410C that respond to temperature changes can provide a visually compelling approach to environmental sensing. For example, they can be used to provide a novel and interesting way to provide a visual indication of whether the temperature of a product, such as a cold drink, falls within a preferred temperature range.

Figure 1E:
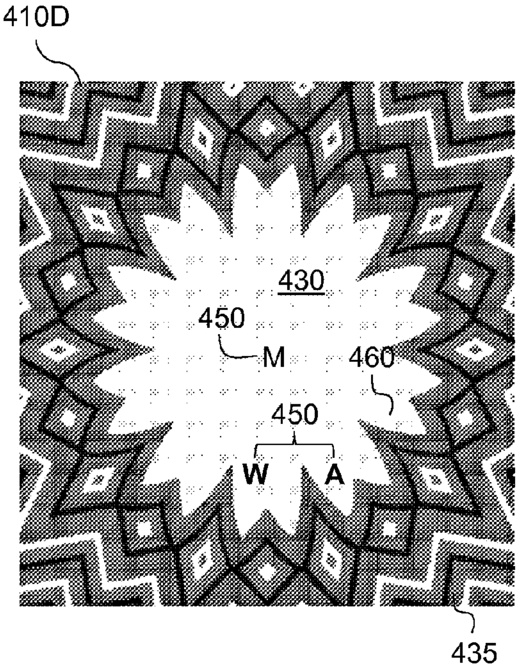

FIG. 1E depicts another exemplary dynamic optical illusion image 410D, which includes a central mutable portion 430 and an outer immutable portion 435, similar to FIG. 1B. In this example, one or more hidden patterns 450 (i.e., the text characters "M" "W" and "A") can be revealed in at least one state of the mutable ink. The hidden patterns 450 can be printed with immutable ink(s) or mutable ink(s), or combinations thereof. For example, photochromic inks that are colorless, or nearly so, when inactivated can be used to print the optical illusion pattern in the mutable portion 430, while immutable inks can be used to print the hidden pattern 450. When the mutable inks are in their colorless state, the hidden pattern 450 is revealed. Then when stimulating light is applied, the mutable inks transition from their colorless states to colored states to provide the complete optical illusion pattern and obscure the visibility of the hidden pattern 450. In some embodiments, the hidden text can be printed with a color pattern that matches the revealed optical illusion pattern so that the hidden pattern 450 blends in with the optical illusion pattern and is essentially invisible. In some embodiments, the hidden pattern 450 is printed with mutable colorants that can be controlled to change to a colorless state at the same time that the mutable inks used to print the optical illusion pattern are controlled to change to their colored state. The hidden pattern 450 can represent an advertising message, a watermark, a security code, a bar code, or any other type of message.

FIG. 1E also illustrates that the hidden pattern 450 can be readily apparent, and appear in the middle of the image as shown by the "M" character. Alternately, the content of the hidden pattern 450 can be more subtly positioned and designed to follow the patterning or contours 460 of the optical illusion image as shown by the "W" and "A" characters. In the latter case, the hidden pattern 450 can follow the contours 460 at an edge or transition between mutable portion 430 and the immutable portion 435 of the dynamic optical illusion image 410D.

In other embodiments, the hidden pattern 450 can be a mutable pattern embedded in the dynamic optical illusion image 410D. For example, most of the dynamic optical illusion image 410D can be static (i.e., printed with normal immutable inks) or partially static (i.e., printed with mixtures of immutable inks and mutable inks), such that a perceptually impactful optical illusion image is present at all times. In this case, the hidden pattern 450 is printed predominantly with mutable inks that can experience dramatic color changes in response to an appropriate external stimulus. As a result, the mutable portion 430 of the dynamic optical illusion image 410D of FIG. 1E can change between first and second appearance states, corresponding to first and second illusion states that change the appearance or perceptual impact of the optical illusion, or change between appearance states that change the appearance of the hidden pattern 450, or combinations thereof. In such instances, the hidden pattern 450 can become visible to an observer in at least one of the colorant states, but detection of the hidden pattern can still be difficult due to the text or code being fully embedded in the optical illusion pattern (including following contours 460), and due to the ongoing presence of part or all of an optical illusion pattern distracting the observer. As such, the dynamic optical illusion image 410D can be an example of steganography, which is the art and science of writing hidden messages (text or code) in such a way that no one, apart from the sender and intended recipient, suspects the existence of the message; a form of security through obscurity. As a variant, the dynamic optical illusion image 410D can be designed to help direct the observer towards the hidden pattern 450 when it appears.

Figure 1F:
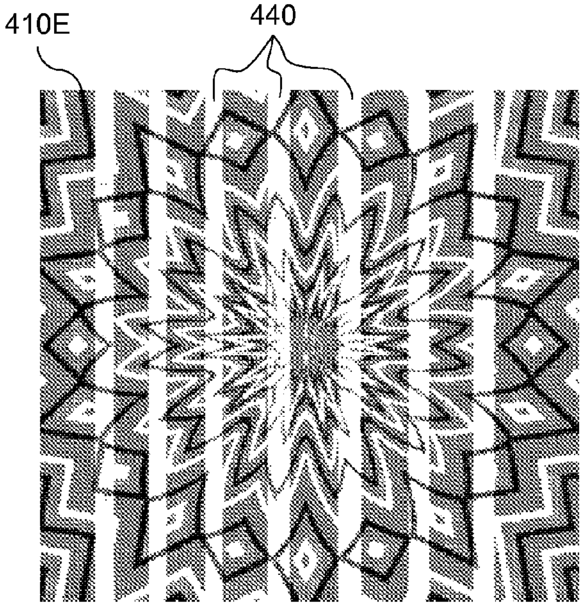

FIG. 1F depicts another exemplary dynamic optical illusion image 410E that responds to a patterned stimulus 440 that is applied in a spatially variant manner. For example, the patterned stimulus 440 can be accomplished with structured lighting or heating. As one example, the entire dynamic optical illusion image 410E can be printed with at least mutable colorants, such that the full extent (length and width or area) of the image can be changed with an appropriate stimulus. However, a localized change to the dynamic optical illusion image 410E can be accomplished if a patterned stimulus 440 is selectively applied according to a structured irradiation pattern. In this case, only the stimulated portions of the dynamic optical illusion image 410E will be changed. In the example shown in FIG. 1F, the patterned stimulus 440 is applied in a striped pattern that does not follow the contours of the optical illusion pattern. In other embodiments, the patterned stimulus 440 can be applied using a pattern that is related to the optical illusion pattern, and for example, involves contour matching.

In some embodiments, the dynamic optical illusion image 410E can include some image regions that use mutable colorants (or combinations of mutable and immutable colorants) and are subject to modification using a patterned stimulus 440, and other image areas that use only immutable colorants and are therefore unaffected by the patterned stimulus 440. In this example, the stimulus can be applied in a spatially variant manner to selectively change the image content in image regions that use the mutable colorants, while leaving the image areas that use only immutable colorants unaffected. For example, the image regions that use the mutable colorants can be printed with photochromic inks that transition from colorless (or pale) color states to colored states when a patterned light stimulus is applied to activate the inks.

Various combinations of structured and unstructured stimuli are also possible. For example, a first stimulus (e.g., light of a first spectral band) can be uniformly applied to the whole image to cause changes in large image areas, while a second stimulus (e.g., light of a second spectral band) can be applied selectively to cause changes in particular image areas.

Returning to a discussion of FIGS. 2A-2C, which depicts the Escher style illusion, the dynamic optical illusion image 410F can be printed using various arrangements of mutable and immutable colorants. In one embodiment, the walkway 505 and the gazebo structure 510 are printed with immutable colorants, and the mutable portion 520 is printed with a combination of immutable and mutable inks For example, the gazebo structure 510 can be printed with a yellow immutable ink, and the walkway can be printed with a combination of yellow and cyan immutable inks so that it has a green color. The mutable portion 520 can then be printed with a combination of a yellow immutable ink that matches the color of the gazebo structure 510, and a photochromic mutable ink that can be controllably switched between a clear state and a cyan state with the application of an appropriate external optical radiation stimulus.

When the photochromic mutable ink is in its unactivated clear state, the mutable portion 520 will have a yellow color matching the color of the gazebo structure 510. In this case, the dynamic optical illusion image 410F has the appearance shown in FIG. 2C, where there is no paradox in the appearance of the walkway 505. When an appropriate stimulating light is applied so that the photochromic mutable ink is switched to its activated cyan state, the mutable portion 520 will have a green color matching the color of the walkway 505. In this case, the dynamic optical illusion image 410F has the appearance shown in FIG. 2B, where the walkway paradoxically appears to be contiguous from the lower tower level to the upper tower level even though it lacks a ramp or stairs. This represents an example of a cognitive optical illusion image.

Figure 5A:
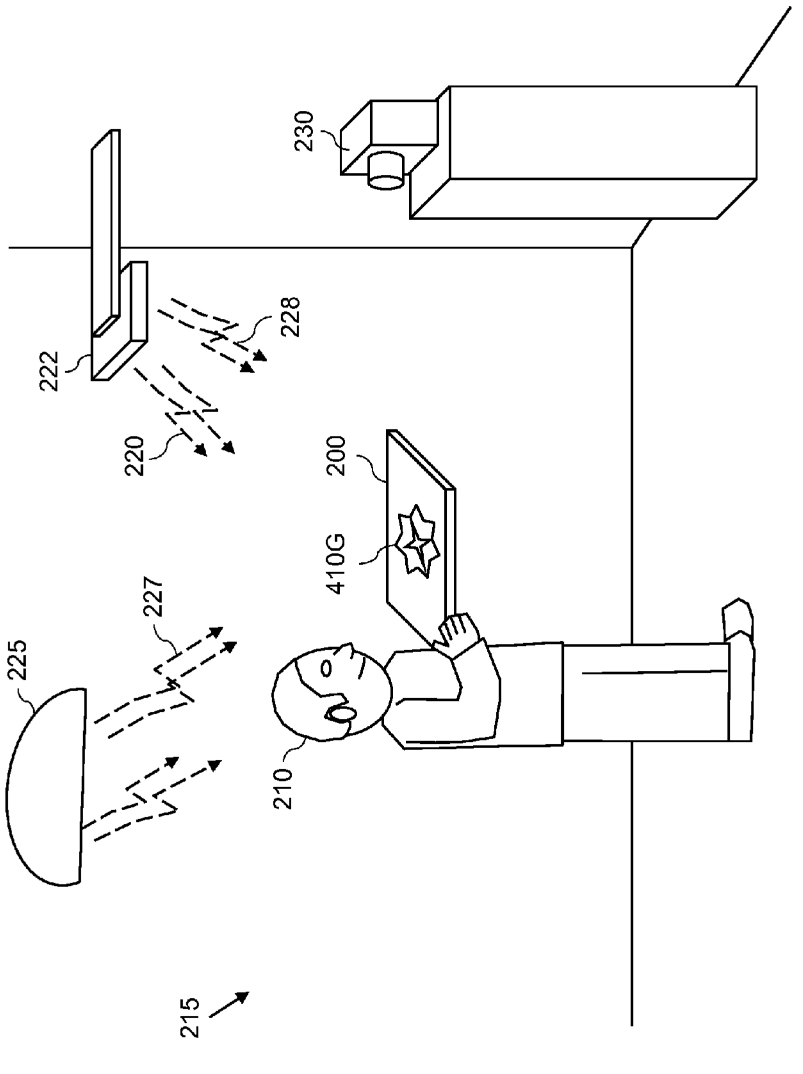
FIG. 5A depicts an observer examining a printed dynamic optical illusion image in accordance with the present invention.

FIG. 5A depicts an observer 210 in a viewing environment 215 interacting with a printed item 200 that includes a printed dynamic optical illusion image 410G. A stimulating radiation source 222 provides an optical radiation stimulus 220 to cause a state change in the mutable inks that are used to print the mutable portions of the printed dynamic optical illusion image 410G, thereby providing two or more illusion states. The optical radiation stimulus 220 can include visible light, or invisible radiation such as ultraviolet or infrared radiation. As shown, the optical radiation stimulus 220 is provided by radiation source 222 that is driven by a controller (not shown) within a system that provides controlled illumination of the printed dynamic optical illusion image 410G. Alternately, the optical radiation stimulus 220 can be sunlight or ambient light, which further can be modulated by a mechanical blade. For at least some illusion states, an optical illusion pattern is revealed in the printed dynamic optical illusion image 410G that then can perceptually impact the observer 210. Visible light 227 in the viewing environment 215 can originate from a light source 225, or can be ambient light including daylight, or combinations thereof. The light source 225 can be a tungsten light source, a fluorescent light source, light emitting diodes (LEDs) or any other kind of light source including a black light.

In some embodiments, the printed dynamic optical illusion image 410G is viewed by the observer as part of a visual experiment, or a marketing study. In this case it is useful for an image capture device 230 such as a digital camera to be included in the viewing environment. This enables the response of the observer 210 to be monitored as the illusion state of the printed dynamic optical illusion image 410G is varied. This monitoring can be conducted to determine emotional or physiological responses to the optical illusion images or accompanying messages (including advertising), or to test or reveal responses related to vision or cognitive research.

In a preferred embodiment, the stimulating radiation source 222 provides an optical radiation stimulus 220 that has little or no visibility to the observer 210. In various embodiments, the optical radiation stimulus 220 can be UV radiation (for example having a bandwidth of 300-380 nm or 360-380 nm), low wavelength blue light (for example having a wavelength of ~420 nm), or infrared radiation (for example having a bandwidth of 800-960 nm) as is appropriate for safely activating or deactivating the printed dynamic optical illusion image 410G. In other embodiments, the stimulating radiation source 222 can provide high intensity visible light 227, or narrow bandwidth laser light, as the optical radiation stimulus 220.

In some embodiments, the printed dynamic optical illusion image 410G can be made using mutable UV responsive inks that are essentially sensitive only to short wavelength UV radiation having wavelengths <300 nm. In this case the optical radiation stimulus 220 should include optical radiation at the corresponding wavelengths. This has the useful advantage that the mutable inks will not be activated by the UV radiation in atmospheric-filtered solar radiation.

Although most photochromic colorants or materials are stimulated to exposure by UV light, versions sensitive to IR light have been reported in the literature. In one embodiment of the present invention, photochromic inks which have at least one stimulative bandwidth that resides between ~1400-1500 nm are used and activated by the appropriate IR optical radiation stimulus 220. These inks have the advantage that they cannot be accidently stimulated by daylight, because the spectral profile of atmospherically filtered solar radiation lacks significant light in that spectral band. Alternately, other IR spectral bands, spanning ~1150-1200 nm, at ~980 nm, and at ~790 nm can be used, although the atmospheric filtering is progressively less effective as the stimulating wavelength drops towards the visible wavelength range. Of course, there are also applications, including artwork or environmental sensing, where it can be advantageous to use photochromic inks that respond to ambient light, including visible light, daylight, or general room lights.

As was discussed with reference to FIG. 1F, it is also noted that the stimulating radiation source 222 can use the techniques of structured illumination to direct a patterned optical radiation stimulus 220 onto the printed dynamic optical illusion image 410G. The pattern of optical radiation can be stationary or can be scanned across the printed dynamic optical illusion image 410G. In general, the intensity of a controlled optical radiation stimulus 220 can be specified in units of watts (W) or lumens of optical flux, or in terms of irradiance (e.g., $mW/cm^2$), or energy (J), or energy density (e.g., $mJ/cm^2$) delivered, with appropriate tolerances (e.g., ±5%) including illumination uniformity or pattern specifications, as appropriate.

The mutable portions of the printed dynamic optical illusion image 410G can also be activated by other types of external stimulus or by combinations of different types of stimuli, which can include a pressure stimulus (e.g., provided by a touch or by sound waves), or a thermal stimulus from a heat source. If thermal stimulation is to be applied broadly, the stimulating radiation source 222 can be used as a physically distant heat source that provides a heat stimulus 228. In some embodiments, a thermal stimulus can be applied using other type of heat sources (e.g., using a resistive heater array) positioned closer to the printed item 200. For example, the printed item 200 can be positioned on top of a surface that contains the controlled heat source. This approach enables the provision of a patterned thermal stimulus. For environmental sensing type applications, the printed dynamic illusion image 410 can respond to a thermal stimulus according to ambient heat levels. The thermal stimulus can be specified in terms of the flux, flux density, energy, or energy density delivered.

Figure 5B:
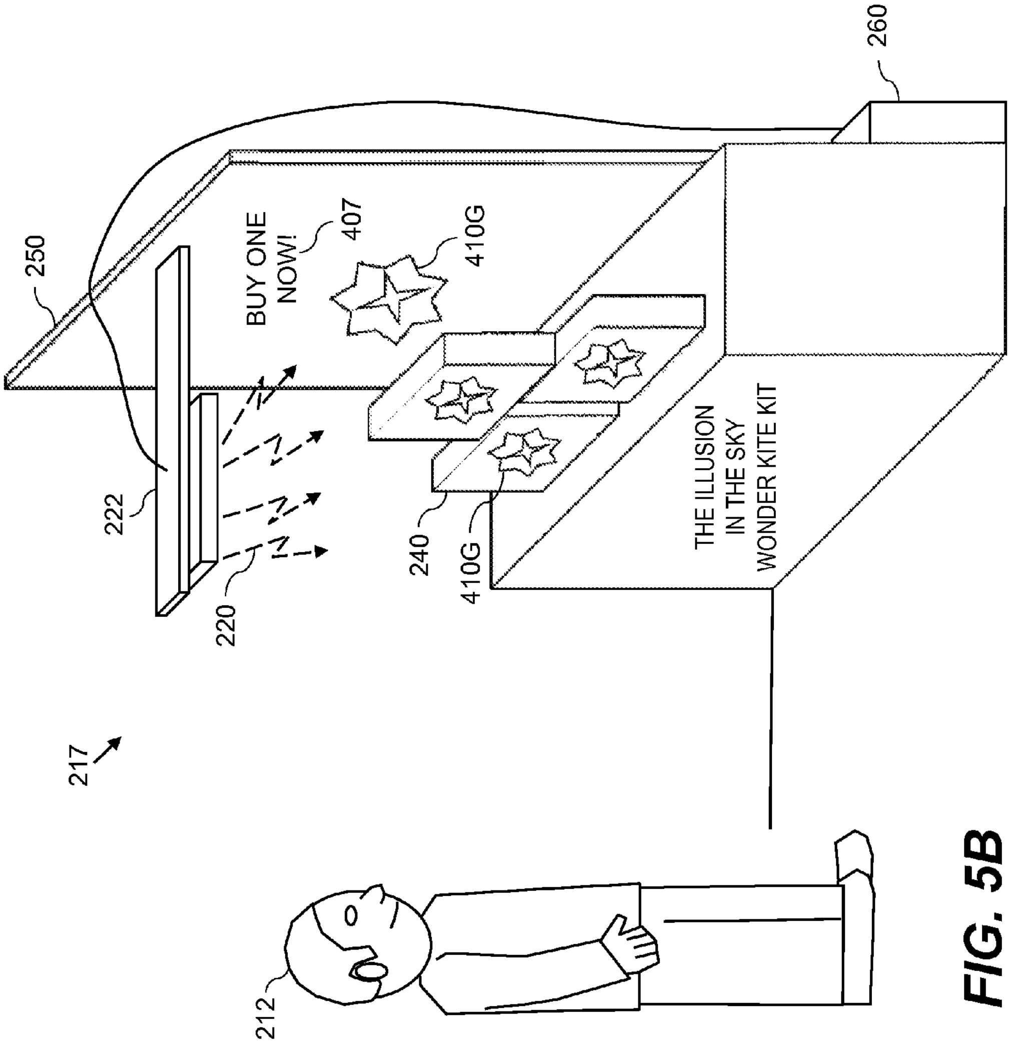
FIG. 5B depicts a retail product display incorporating printed dynamic optical illusion images in accordance with the present invention.

In some embodiments, the printed dynamic optical illusion image 410G can be used to attract the attention of a consumer 212 in a retail viewing environment 217 as shown in FIG. 5B. In this example, a system for presenting the printed dynamic optical illusion image 410G to an observer 210, having sources of external stimulus and a controller thereof, is shown. For example, this system can be a retail product display, including a product display arrangement for displaying retail products packaged in product packaging 240, and an advertisement display 250. Both the product packaging 240 and the advertisement display 250 include printed dynamic optical illusion images 410G. It will be recognized that in some embodiments only one of the product packaging 240 or the advertisement display 250 will include the printed dynamic optical illusion images 410G. The product display arrangement shown in FIG. 5B includes a shelf for stacking the retail products. However, it will be recognized that the retail products can be displayed with any type of product display arrangement known in the art including, but not limited to, display racks, hooks, bins and refrigerators or freezers.

A controller 260 is used to provide a control signal to control the stimulating radiation source 222 in order to provide the appropriate stimulus as required to change the appearance states of the mutable portions, thereby changing the illusion states of the printed dynamic optical illusion images 410G. In particular, controller 260 controls the dosage of the external stimulus applied to the dynamic optical illusion images 410G in order to cause a change in the colorant states of the mutable colorants. The controlled parameters can include light dosage (e.g., intensity, exposure time or modulation, spectral bandwidth, direction or patterning) or heat dosage (e.g., intensity, exposure time, direction, or modulation), where the dosages and dosage tolerances can be appropriate to provide endpoint colors or intermediate colors. In some embodiments, the controller 260 controls the stimulating radiation source 222 to automatically switch the printed dynamic optical illusion images 410G between first and second illusion states according to a predefined timing pattern. For example, the illusion states can be switched every 30 seconds. In some embodiments, the controller 260 controls the stimulating radiation source 222 to switch the printed dynamic optical illusion images 410G between the different states in response to user activation of a user interface control such as a button, a switch, a pointing device (e.g., a mouse or a trackball), or a touch sensitive display.

The inclusion of printed dynamic optical illusion images 410G in the product packaging 240 can take different forms in various embodiments. For example, the printed dynamic optical illusion images 410G can be printed on a box or other container used to enclose the retail product, it can be printed onto a surface of the retail product itself, it can be included on a printed label that is attached to or inserted into the product packaging 240, or it can be included in any type of printed product packaging known in the art.

The inclusion of the printed dynamic optical illusion images 410G in the advertisement display 250 can also take different forms in various embodiments. For example, printed dynamic optical illusion images 410G can be included in posters (e.g., movie posters), retail end-cap displays, store shelf displays, signage, an advertising brochure, an advertisement in a printed publication (e.g., a magazine or a newspaper), or any other type of advertisement display 250 known in the art.

The retail display also includes a stimulating radiation source 222 for providing the optical radiation stimulus 220 used for controllably switching the illusion state of the printed dynamic optical illusion images 410G. The stimulating radiation source 222 can be controlled to switch between illusion states on a regular interval in order to attract the attention of the consumer 212 in order to increase the likelihood that a product is purchased. In other embodiments, different forms of external stimuli can also be incorporated into the retail viewing environment, such as thermal heat sources.

The portrayal of dynamic optical illusion images also has other applications. For example, as the illusion state of a dynamic optical illusion image 410 is changed, a hidden pattern 450 can appear, including being imbedded or contour following, as shown in FIG. 1E. Color change effects, including contrast or lightness changes or saturation, can hide or reveal other illusionary content, or other images, or hidden patterns 450, from image layers accompanying the dynamic optical illusion image 410A. The observer can examine a printed dynamic optical illusion image 410G (FIG. 3A) or a dynamic optical illusion image 410H (FIG. 3A) on a display 120, during which time the optical illusion(s) can either attract or distract the attention of an observer from the hidden pattern 450. In particular, these changeable images can be used as a dynamic method to provide access to a password key or as a type of CAPTCHA, (i.e., a "Completely Automated Public Turing test to tell Computers and Humans Apart"), where the observer reveals and discovers the hidden pattern 450 or image from one or more of the illusion states. For example, some letters of a hidden text message can be revealed in one illusion state, and other letters, in other illusion states. In response, the observer can provide the CAPTCHA word(s) or image(s), for example as a verification code to gain limited access to a limited access website.

Alternately, the observer can provide an input about the visual qualities or perceptual impact of the optical illusion(s) present in one or more states of a dynamic optical illusion image, or a series of such images, as the illusion states of the image(s) change. Exemplary questions can include: "In what portion of an image is an optical illusion image present?" or "In what direction does the optical illusion image appear to move or rotate?" or "Does the image appear to be static, pulsing, moving, rotating, or scintillating?"

The two approaches, using hidden patterns 450 embedded in a dynamic optical illusion image, and asking questions regarding illusion perception, can also be used in combination for a more difficult reverse Turing test. As differences in visual perception exist among humans (e.g., color blindness), the choice of illusions used can be tailored to different circumstances. By comparison, U.S. Pat. No. 7,929,805 by Wang et al., entitled "Image-based CAPTCHA generation system," provides for an image-based CAPTCHA generation system, but it is reliant on distorting images to hide the human decipherable message, rather than using optical illusions to do so.

Dynamic optical illusion images 410 formed in accordance with the present invention can also be used for a variety of other purpose. For example, they can be used for applications such as security, stenography, watermarking, cognitive and visual testing, cultural or consumer research, interactive clothing or textiles and environmental sensing. They can also be used for entertainment applications, as in puzzles, games, artwork and novelty books.

Figure 6B:
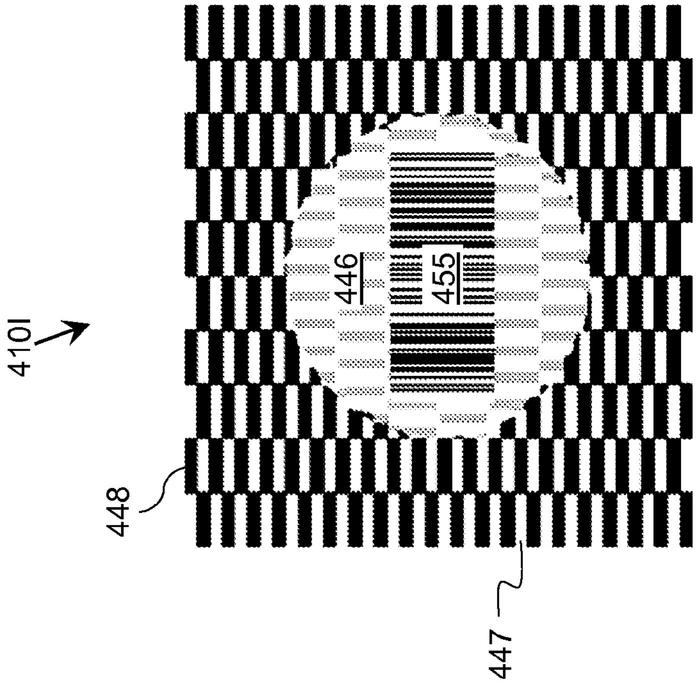
FIGS. 6A and 6B depict two illusion states of a printed dynamic optical illusion image based on the Ouchi illusion.
Figure 6A:
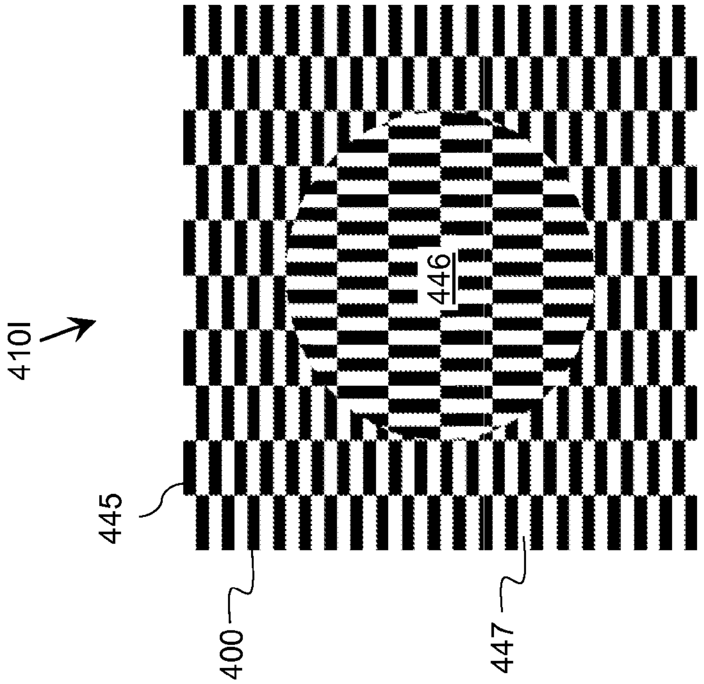

As discussed previously, some optical illusion images 400, including some of the physiological variety, require color image content in order for the optical illusion to be visible. In other cases, even if the optical illusion may be visible for grayscale versions of the optical illusion image, the visual effect of the optical illusion is strongly enhanced by the use of appropriate colors. Other optical illusions do not rely on the use of color, and will have a substantial visual impact, even when they are printed in black and white. For example, FIG. 6A depicts an optical illusion image 400 having a pattern known as the Ouchi illusion which can be dynamic optical illusion image 410I printed using mutable inks The Ouchi illusion is typically printed as a black and white image, although it also works as a color illusion. The Ouchi illusion has two patterns of tiled black and white rectangles. The rectangles are arrayed vertically in a circular central image region 446, and are arrayed horizontally in the surround image region 447. Other versions of this illusion, with patterns of tiled lines or with a set of parallel lines (like a grating) are also available. Typically observers perceive the inner central image region 446 to float around as the page or the observer's eyes move. In particular, the central image region 446 is seen as either floating in front of the surround image region 447, or as a pattern being viewed through a hole in the surround image region 447. This sense of depth is considered to arise as a result of the illusory relative motion. This perception of anomalous motion from this illusion has not been fully explained, but it involves an interaction between the edges of the constituent rectangles, their spatial frequency, and eye motion (saccades). The visual response peaks when the pattern in the central disk region has a spatial frequency dependence that repeats at 4-7 cycles/degree, with the effect varying with the size of the central image region 446.

As a further example, the optical illusion image 400 of FIG. 6A is adapted to be a dynamic optical illusion image 410I having a first illusion state 445 and a second illusion state. In that context, FIG. 6A depicts the first illusion state 445 and FIG. 6B depicts a second illusion state 448 for the dynamic optical illusion image 410I. In the depicted second illusion state 448, the constituent rectangles in the central image region 446 have been altered to be lighter or have less contrast, as can be accomplished using mutable inks in accordance with the present invention. For example, the central image region 446 can be printed with a photochromic ink that has a similar color and contrast to a normal ink printed in the outer image region 447 when it is in its activated state. When the photochromic ink is activated, the perception of the illusion can be strong for an observer. Whereas, when the photochromic ink is in an unactivated state, the central image region 446 can provide a low contrast pattern (as shown in FIG. 6B) or no pattern at all. In this case, many observers will perceive a greatly reduced motion effect. It is noted that an Ouchi pattern can be changed as a dynamic optical illusion image 410I in other ways to impact the perception of an illusion, including by changing the central disk region size or the spatial frequency of the tile pattern.

The second illusion state 448 of the dynamic illusion image 410I of FIG. 6B also includes the possibility of hidden image content (e.g., hidden pattern 455) becoming visible at the same time that other image content becomes less visible with application of the external stimulus. For example, the central image region 446 can be printed with a mixture of photochromic and thermochromic inks A mixed stimulus of optical radiation and thermal stimuli can be applied to independently control the state of the different image content. For example, the colorant state of the photochromic ink can be controlled to become more colored while the colorant state of the thermochromic ink can be controlled to become less colored, thereby changing the appearance state of the mutable central image region 446 in order to switch between the first illusion state 445 of FIG. 6A and the second illusion state 448 of FIG. 6B. In this way, the relative visibility of the hidden pattern 455 or the optical illusion image content can be independently controlled.

Where FIG. 1E illustrated the use of a hidden pattern 450 comprising human readable text message, in FIG. 6B, the hidden pattern 455 is a machine readable barcode. The inclusion of hidden patterns in a dynamic optical illusion image can be generalized such that any sort of hidden image content can be made to become more visible (to a human observer or a machine) upon application of an appropriate stimulus by using mutable colorants. This can occur while other image content, including illusionary image content, either remains static or also changes in appearance. Essentially, a sequence of layered images is accessible within or behind the dynamic optical illusion image. Of course, an external stimulus such as heat or light can also hide or reveal hidden image or information content that is outside of or adjacent to the dynamic optical illusion image 410, as illustrated by adjacent image content 407 of FIGS. 3A and 5B. Generally, hidden patterns 455 with a regular or semi-regular patterning, like bar codes or QR codes, can be hidden better within optical illusion images having regular geometric patterning, like the Ouchi or the well-known café wall style illusions. These machine readable hidden patterns 455 can not only comprise black and white patterns, as is shown in FIG. 6B, but variable color patterns as well. It should be understood that hidden patterns 455 can also be printed with mutable inks to follow the contours or patterning of the illusion image, much as shown with the "W" and "A" text characters of FIG. 1E.

From the prior discussions, it is clear that optical illusion images cause perceptual impact by revealing or exploring different attributes of the human visual system. The presence or absence of color impacts the effectiveness of some illusions. The spatial frequencies of the image details, such as the tile pattern in the Ouchi illusion of FIG. 6A, impact the effectiveness of other illusions. Some illusions are more effective if the image feature edges are straight, abrupt, and regularly patterned (e.g., the Ouchi illusion of FIG. 6A), while in other illusions (e.g., the peripheral drift illusion of FIG. 1A), the use of curved edges is more effective. Likewise, many illusions are dependent on the size of their field of view. In particular, optical illusion images such as the peripheral drift illusion of FIG. 1A are preferably large enough, relative to the field of view of the observer, that part of the image is perceived by the peripheral vision. Essentially, that means the outer portions of the image should exceed ~10° to the eye of the observer. That occurrence is clearly dependent on the size of the optical illusion image and the distance between the printed object and the observer. By comparison, the Ouchi illusion image shown in FIG. 6A, is optimized for specific spatial frequencies and induces an illusionary visual response linked to small eye movements (saccades). As a result, it has the greatest perceptual impact with image sizes that are smaller than the FIG. 1A optical illusion image, which instead interacts with the observer's peripheral vision. Thus the printed optical illusion images should be presented within a size range that will support the perceptual effects for a target nominal viewing range. Alternately, dynamic optical illusion images 410 can be modified to provide size or field of view changes, using mutable inks for example, such that multiple viewing distances can be supported, or that size changes alter the perceptual impact.

In some embodiments, the dynamic optical illusion images 410 are formed using irreversible mutable colorants that can only undergo a single state change (e.g., from clear to colored). In this case, the mutable colorants therein can be subjected to an external stimulus (such as heat or light) just once to induce changes in image content. In other embodiments, the dynamic optical illusion images are formed using reversible mutable colorants that can be repeatedly cycled back and forth between the different colorant states multiple times in succession.

In some embodiments the amount of the stimulus that is applied to the mutable inks can be used to control the amount of color change that is produced. In this way it is possible to achieve a range of colorant states providing intermediate colors 360, as suggested in FIGS. 4A-4E, if so desired. In the above examples, corresponding to FIGS. 1A-1F, FIGS. 2A-2C, and FIGS. 6A-6C, mutable portions 430 of dynamic optical illusion images 410 and 410A-410I were subject to changes using mutable colorants. It should be understood that the entirety of a dynamic optical illusion image 410, as well as adjacent image content 407, can be subject to changes using mutable colorants.

For many mutable inks, the color change response time is a few seconds or less, with some photochromic inks having response times as small as a microsecond. Therefore, an applied external stimulus to the printed content can potentially be modulated at video rates (~30 frames/sec) or faster. However, if different optical illusions associated with the individual images or frames are to be perceived by an observer, the modulation rate needs to be reduced, likely to several seconds per frame or more. In general, the perception of optical illusions requires some concentration, during which an observer perceives the image content itself and then the physiological illusionary effect or cognitive illusionary puzzlement. This process typically takes at least several seconds or longer. Therefore the temporal cycling between image states should generally include a prolonged image retention time (of many seconds per image, if not minutes or longer) before changing the dynamic optical illusion image. As many color mutable inks are metastable, and can retain their color changes for minutes or hours once stimulated, this result is easily achievable. Therefore, the dosage specification for an external stimulus can include temporal modulation parameters, including exposure switching times, image retention times, and duty cycles in the case or cyclic exposures.

It should be understood that the mutable inks used to exercise the inventive method for creating and using dynamic optical illusion images can be advantaged if they have other properties in addition to those previously discussed. As an example, for some applications, it can be desirable to allow printed content including dynamic optical illusion images to change appearance for awhile, but then to have this function permanently disabled, rendering the ink permanently colored or colorless. For example, UV radiation can be applied to many chemicals or mixtures, including some photochromic or thermochromic inks, to break chemical bonds so that color changes are no longer possible. In the case of photochromic inks, this disabling light dosage (wavelength, intensity, and time) needs to be sufficiently distinct from the activating light dosages that accidental damage is unlikely to occur. As another example, the increased availability of photochromic or thermochromic inks with reduced viscosities can better enable inkjet printing of these inks Additionally, for some applications, having photochromic inks that transition from colored to colorless states when the light stimulus is applied can be useful. Similarly, irreversible thermochromic inks which provide multiple temperature dependent color states can be useful.

Figure 7:
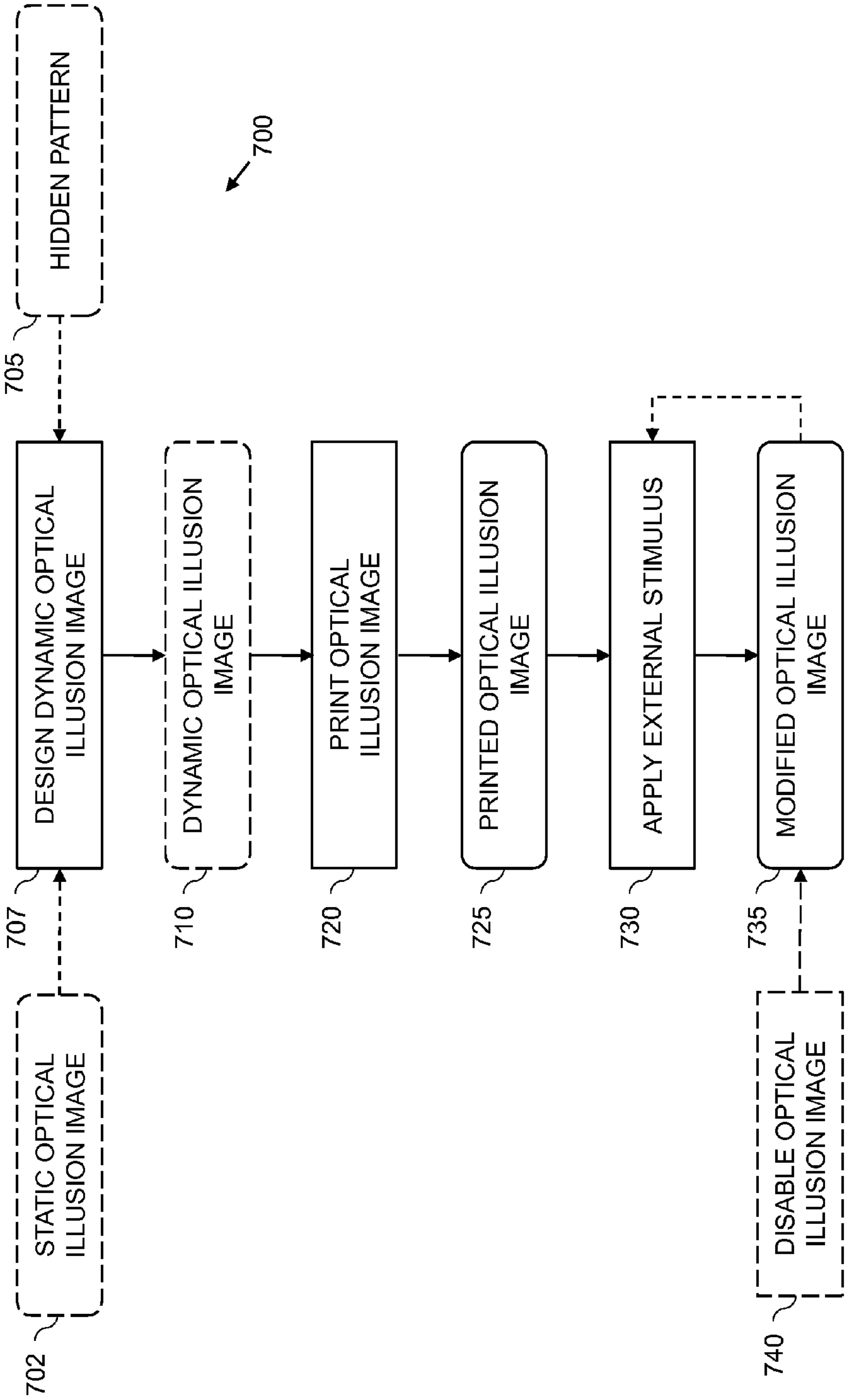
FIG. 7 is a flowchart illustrating a method for forming a printed optical illusion image in accordance with the present invention.

FIG. 7 shows a flowchart summarizing a dynamic optical illusion method 700 for providing functional printing of a printed optical illusion image 725 in accordance with the present invention. A design dynamic optical illusion image step 707 is used to design a dynamic optical illusion image 710 having one or more mutable portions. The mutable portions are designed such that when they are changed from a first appearance state to a second appearance state, the dynamic optical illusion image 710 progresses from a first illusion state to a second illusion state respectively, wherein changing the dynamic optical illusion image 710 between the first and second illusion states affects the perception of an optical illusion by a human observer.

In some embodiments, the dynamic optical illusion image 710 can be designed starting from an original static optical illusion image 702. One or more image regions of the static optical illusion image 702 are then designated to be the mutable portions. First and second appearance states for the mutable portions are then defined to provide different appearances for the optical illusion, corresponding to the first and second illusion states for the dynamic optical illusion image 710.

As has been described earlier, in some embodiments a hidden pattern 705 can be provided for inclusion in the dynamic optical illusion image 710. The hidden pattern 705 can be a human readable pattern, including text, or a machine readable pattern that is visible in at least one of the illusion or appearance states. Changes between appearance states can also cause changes in the appearance of hidden text or codes within or adjacent to the optical illusion portion of the dynamic optical illusion image 710, with or without causing changes in the perceptual impact of the optical illusion. During the design dynamic optical illusion step 707, the expected appearances of the dynamic optical illusion image 710, including any hidden patterns 705, for two or more illusion states, can be previewed using a softcopy display 120 (FIG. 3A).

The design dynamic optical illusion image step 707 produces a specification for the dynamic optical illusion image 710, which is then used in a print optical illusion image step 720, to print the dynamic optical illusion image 707 on a printer and thus provide a printed optical illusion image 725. The printed optical illusion image 725 is printed according to a determined print specification using a plurality of colorants, including at least one appearance mutable colorants having spectral characteristics can be controllably switched between a first colorant state and a second colorant state by application of an appropriate external stimulus. The specified appearance states of the mutable portions of the printed dynamic optical illusion image 725 are achieved by appropriate selection of the colorant levels for the plurality of mutable colorants, as well as any immutable colorants. The print specification specifies the colorant levels as a function of position for the mutable and immutable colorants, which can be optimized according to the spectral characteristics and other properties of the mutable and immutable colorants and the printing devices used to produce the printed dynamic optical illusion image 725. The colorant levels can be determined via look-up tables, algorithms or other means to provide an appropriate print specification that will provide the desired illusion states for the printed dynamic optical illusion image 725. Alternately, the printing device can receive the specification for the dynamic optical illusion image 710 and can apply corrections, via look up tables, alogorithms, or other means, to determine the colorant levels. In either case, the goal is to achieve appropriate image quality attributes, including color matches, color gamut, color accuracy, the presence of intermediate colors, metamerism, resolution, or contrast for the printed optical illusion image 725 in activated and inactivated states.

An apply external stimulus step 730 is used to apply an appropriate external stimulus to the printed optical illusion image 725 to produce a modified optical illusion image 735 having a different illusion state. In some embodiments, the apply external stimulus step 730 can be replied repeatedly to modify the illusion state of the printed optical illusion image 725 a plurality of times.

In some embodiments, and optional disable optical illusion image step 740 can be applied, for example using an appropriate UV radiation dosage or a heat or chemical treatment, to prevent further modulation of the printed dynamic optical illusion image 725 between illusion states or appearance states.

The present invention, relative to creating and using dynamic optical illusion images 410, has been explained using a limited set of examples, including a peripheral drift optical illusion (FIGS. 1A-1F), a cognitive optical illusion that manipulates perspective cues to create the visual impression of a physically impossible structure (FIGS. 2A-2C), and a Ouchi optical illusion (FIGS. 6A-6B). However, the functional printing of dynamic optical illusion images 410 can be applied to a wide variety of different types of optical illusion images 400. For example, one or more optical illusion images, including combinations of static and dynamic optical illusion images, can be printed together, adjacently or overlapping, within the layout of a larger optical illusion image. While FIGS. 1A-1F depicted potential changes to a given illusion image, a dynamic optical illusion image can also be designed to transition from one optical illusion to another, for example, from a peripheral drift illusion to scintillating illusion. Also, optical illusion images can be chosen for perceptual impact, cultural or age sensitivity, color content, ability to hide text, messages or codes, or for other reasons.

As the prior discussion has suggested, optical illusion categories are very broad, and there are many demonstrated optical illusions within any particular category. As an example, in the paper "Perceiving the present and a systematization of illusions" by Changizi et al. (Cognitive Science, Vol. 32, pp. 459-503, 2008), perceptual motion and size illusions were parsed into 28 classes or groupings. It should be understood that the inventive method for creating and using dynamic optical illusion images 410 includes modifying optical illusion images 400 selected from a group including, but not limited to, geometrical or spiral illusions, anomalous motion illusions, rotational illusions, color change illusions, peripheral drift illusions, positive after image blurring illusions, scintillation and grid illusions, convection, contraction and expansion illusions, contrast polarity illusions, perspective illusions, or variations and combinations thereof. While these illusions cannot all be depicted here, the method of the present invention can be applied to many optical illusions that are known in the art, which include, but are not limited to the Hering illusion, the Orbison illusion, the Delboeuf illusion, the Müller-Lyer illusion, the Wundt Illusion, the Ehrenstein illusion, the Hermann grid Illusion, the scintillating grid illusion, the pulsing vortex illusion, the Fraser-Wilcox illusion, the Ouchi illusion, the peripheral drift illusion, the flowing leaves illusion, the waves illusion, the moving bulge illusion, the Café Wall illusion, the rotating snakes illusion, the Kanizsa Triangle illusion, the Munker-White Illusion, Adelson's checker shadow illusion, comparative color illusions, the Zollner Illusion, the Ponzo illusion, or impossible figures such as the Penrose Triangle or the Penrose Stairs, or variations and combinations thereof.

It is noted that U.S. Pat. No. 7,136,522 by S. Harrington et al. entitled "Systems for spectral multiplexing of source images to provide a composite image, for rendering the composite image, and for spectral demultiplexing of the composite image to animate recovered source images," provides an alternative method of intelligent printing that provides a composite image having a multitude of source images printed within it using a plurality of colorants or inks With this approach, the individual source images can be rendered distinguishable when the composite image is subjected to illumination by narrow band illuminants. However, the inks are normal process inks rather than chromogenic or mutable inks The printed composite image can appear different to an observer based on the spectral absorption and reflection of the inks with respect to the illuminating light spectrum, in order to reveal different hidden source images. The rendered composite image may be subjected to a varying illumination, including by a switched sequence of individually activated, differing illuminants to cause a corresponding sequence of source images to be recovered in rapid succession. Harrington does not provide that the either the composite image or source images are optical illusion images.

The invention has been described in detail with particular reference to certain preferred embodiments thereof, but it will be understood that variations and modifications can be effected within the scope of the invention. It is emphasized that the apparatus or methods described herein can be embodied in a number of different types of systems, using a wide variety of types of supporting hardware and software. It should also be noted that drawings are not drawn to scale, but are illustrative of key components and principles used in these embodiments.

The invention has been described in detail with particular reference to certain preferred embodiments thereof, but it will be understood that variations and modifications can be effected within the spirit and scope of the invention.

PARTS LIST

100 printer
110 print media
120 display
130 screen
150 data processor
160 printer
165 web print media
170 print stations
170*c* print station
170*m* print station
170*y* print station
170M print station
175 print head
177 nozzles
178 fluid jets
180 ink droplets
200 printed item
210 observer
212 consumer
215 viewing environment
217 retail viewing environment
220 optical radiation stimulus
222 stimulating radiation source
225 light source
227 visible light
228 heat stimulus
230 image capture device
240 product packaging
250 advertisement display
260 controller
300 graph
302 graph
304 graph
306 graph
308 graph
310 unactivated spectral reflectance profile
312 activated spectral reflectance profile
320 unactivated spectral absorption profile
322 activated spectral absorption profile
350 first colorant state
355 second colorant state
360 intermediate colorant state
400 optical illusion image
405 image
407 adjacent image content
410 dynamic optical illusion image
410A dynamic optical illusion image
410B dynamic optical illusion image
410C dynamic optical illusion image
410D dynamic optical illusion image
410E dynamic optical illusion image
410F dynamic optical illusion image
410G printed dynamic optical illusion image
410H dynamic optical illusion image
410I dynamic optical illusion image
420 image regions
422 image regions
424 image regions
426 image regions
430 mutable portion
435 immutable portion
440 striped stimulus pattern
445 first illusion state
446 central image region
447 surround image region
448 second illusion state
450 hidden pattern
455 hidden pattern
460 contour
500A first illusion state
500B second illusion state
505 walkway
510 gazebo structure
520 mutable portion
700 dynamic illusion method
702 static optical illusion image
705 hidden pattern
707 design dynamic optical illusion image step
710 dynamic optical illusion image
720 print optical illusion image step
725 printed optical illusion image
730 apply external stimulus step
735 modified optical illusion image
740 disable optical illusion image

The invention claimed is:

1. A method for providing a printed dynamic optical illusion image having first and second illusion states, comprising:

receiving a specification of a dynamic optical illusion image having one or more mutable portions with at least two appearance states, such that when the mutable portions are in a first appearance state the optical illusion image has a first illusion state, and when the mutable portions are in a second appearance state the optical illusion image has a second illusion state, wherein changing the optical illusion image from the first illusion state to the second illusion state affects the perception of an optical illusion by a human observer; and using a printing device to print the dynamic optical illusion image on a print media using a plurality of colorants, wherein one or more of the colorants are appearance mutable colorants having spectral characteristics that can switch between a first colorant state and a second colorant state by application of an appropriate external stimulus provided by an external stimulus source, wherein the mutable portions of the optical illusion image are printed using at least one appearance mutable colorant;

wherein the printed optical illusion image can switch between the first and second illusion states by applying the appropriate external stimulus that switches the one or more appearance mutable colorants between their first and second colorant states, thereby switching the mutable portions of the printed optical illusion image between their corresponding first and second appearance states;

wherein the appearance mutable colorants include dyes or pigments that undergo a chemical change in response to the application of the external stimulus to switch between the first colorant state and the second colorant state.

2. The method of claim 1 wherein the changing of the dynamic optical illusion image from the first illusion state to the second illusion state causes the optical illusion to become visible, alters the visual impact of the optical illusion or introduces one or more additional optical illusions.

3. The method of claim 1 wherein the dynamic optical illusion image includes one or more immutable portions, and wherein the first or second appearance state for at least one of the mutable portions provides a color match to one of the immutable portions.

4. The method of claim 1 wherein the spectral characteristics that can be switched include spectral absorption characteristics, spectral reflectance characteristics, spectral transmission characteristics, or spectral fluorescence characteristics.

5. The method of claim 1 wherein the external stimulus source is a controlled stimulus source.

6. The method of claim 5 wherein the external stimulus is applied according to a predefined timing pattern.

7. The method of claim 5 further including switching the appearance mutable colorants between their first and second colorant states by controlling the controlled stimulus source to provide a controlled dosage of the external stimulus.

8. The method of claim 7 wherein the dosage of the external stimulus is controlled by controlling an intensity, an exposure time, a retention time, a duty cycle, a direction or a modulation of the external stimulus.

9. The method of claim 7 wherein the dosage of the external stimulus is controlled to provide an intermediate colorant state intermediate to the first and second colorant states, thereby providing an intermediate appearance state for the mutable portions intermediate to the first and second appearance states.

10. The method of claim 1 wherein the external stimulus source is an ambient stimulus source.

11. The method of claim 1 wherein the one or more appearance mutable colorants include a photochromic colorant having spectral characteristics that can be switched by an optical radiation stimulus, and wherein the external stimulus source is an optical radiation source providing the optical radiation stimulus.

12. The method of claim 11 wherein the optical radiation source provides a visible light radiation stimulus, an ultraviolet radiation stimulus, an infrared radiation stimulus, or a combination thereof.

13. The method of claim 11 wherein the photochromic colorant responds to optical radiation at wavelengths outside of a spectral bandwidth for atmospherically filtered solar radiation.

14. The method of claim 11 wherein the optical radiation source is an ambient stimulus source that includes room lights or daylight.

15. The method of claim 11 wherein the optical radiation source provides a structured optical irradiation pattern.

16. The method of claim 1 wherein the one or more appearance mutable colorants include a thermochromic colorant having spectral characteristics that can be switched by a thermal stimulus, and wherein the external stimulus source is a thermal source providing the thermal stimulus.

17. The method of claim 16 wherein the thermal stimulus is a change in an ambient temperature, and wherein the printed dynamic optical illusion image is used to provide a temperature sensing function.

18. The method of claim 16 wherein the thermal source provides a structured heating pattern.

19. The method of claim 1 wherein the one or more appearance mutable colorants include an electrochromic colorant having spectral characteristics that can be switched by an electrical stimulus.

20. The method of claim 1 wherein the first appearance state and the second appearance state of the mutable portions differ in at least one of a hue, saturation or lightness color appearance characteristic.

21. The method of claim 1 wherein the first appearance state and the second appearance state of the mutable portions differ in image contrast or image content.

22. The method of claim 1 wherein the first colorant state and the second colorant state of the appearance mutable colorants differ in a shape or amplitude of the spectral characteristics.

23. The method of claim 1 wherein one or more of the colorants are immutable colorants having spectral characteristics that are constant, and wherein portions of the optical illusion image that are not mutable portions are printed using the immutable colorants.

24. The method of claim 23 wherein at least one of the mutable portions of the printed optical illusion image is printed using a combination of colorants including at least one appearance mutable colorant and at least one immutable colorant.

25. The method of claim 1 wherein the first colorant state or the second colorant state for at least one of the mutable colorants is a clear state, colorless state, nearly colorless state or a fully colored color state.

26. The method of claim 1 wherein at least one of the appearance mutable colorants is reversible such that it can be repeatedly switched between its first and second colorant states.

27. The method of claim 1 wherein the printed dynamic optical illusion image is subjected to multiple applications of the external stimulus to provide multiple changes in the colorant states of the appearance mutable colorants.

28. The method of claim 1 wherein at least one of the appearance mutable colorants is irreversible such that it can only be switched from its first colorant state to its second colorant state a single time.

29. The method of claim 1 wherein the printed optical illusion image includes one or more human recognizable textual or symbolic messages that can be perceived by a human observer when the one or more mutable portions are in at least one of their first or second appearance states.

30. The method of claim 29 wherein at least one of the human recognizable textual or symbolic messages follows a contour of image content within the printed dynamic optical illusion image.

31. The method of claim 1 wherein the printed optical illusion image includes one or more machine readable textual or symbolic messages that can be perceived by a machine vision device when the one or more mutable portions are in at least one of their first or second appearance states.

32. The method of claim 29 wherein at least one of the machine readable textual or symbolic messages follows a contour of image content within the printed dynamic optical illusion image.

33. The method of claim 1 wherein one or more of the mutable portions are outside an area occupied by the optical illusion.

34. The method of claim 1 wherein the first and second illusion states differ with respect to a field of view, spatial frequency content, patterns, or contours of the optical illusion.

35. The method of claim 1 further including the step of applying a disabling external stimulus that causes the mutable colorants to become immutable.

36. The method of claim 1 further including previewing the dynamic optical illusion image on a softcopy display.

37. The method of claim 1 wherein the print media is paper, cardboard, cloth, textile, plastic, polymer, glass, metal or a multi-layer composite material, or a combination thereof.

38. The method of claim 1 wherein the printing device is an inkjet printer, an electrophotographic printer, an offset litho printer, a dry offset printer, a letterpress printer, a gravure printer, a flexography printer or a screen printer.

39. The method of claim 1 wherein the printed dynamic optical illusion image is a component of an advertisement, an advertising display, or product packaging for a consumer product.

40. The method of claim 1 wherein the printed dynamic optical illusion image is used for consumer testing, for cognitive or visual testing, for steganography, for a reverse Turing test, or as a CAPTCHA.

41. The method of claim 1 wherein the printed dynamic optical illusion image is used to provide an environmental sensing function.

42. The method of claim 1 wherein the printed dynamic optical image has illusion states that include a cognitive optical illusion, a physiological optical illusion, or a combination thereof.

43. The method of claim 42 wherein the physiological optical illusion is a color perception optical illusion or an apparent motion optical illusion that produces the appearance of motion in a static image.

* * * * *